Jan. 28, 1969    F. G. GETCHELL ET AL    3,424,356
DRAPERY PLEATING, FINISHING AND SIZE CONTROL MACHINE
Filed June 5, 1963

FREDERICK G. GETCHELL
JAMES W. GETCHELL
HAROLD K. TRUNNELL
INVENTORS.
BY
BUCKHORN, BLORE, KLARQUIST & SPARKMAN
ATTORNEYS

Jan. 28, 1969   F. G. GETCHELL ET AL   3,424,356
DRAPERY PLEATING, FINISHING AND SIZE CONTROL MACHINE
Filed June 5, 1963   Sheet 3 of 15

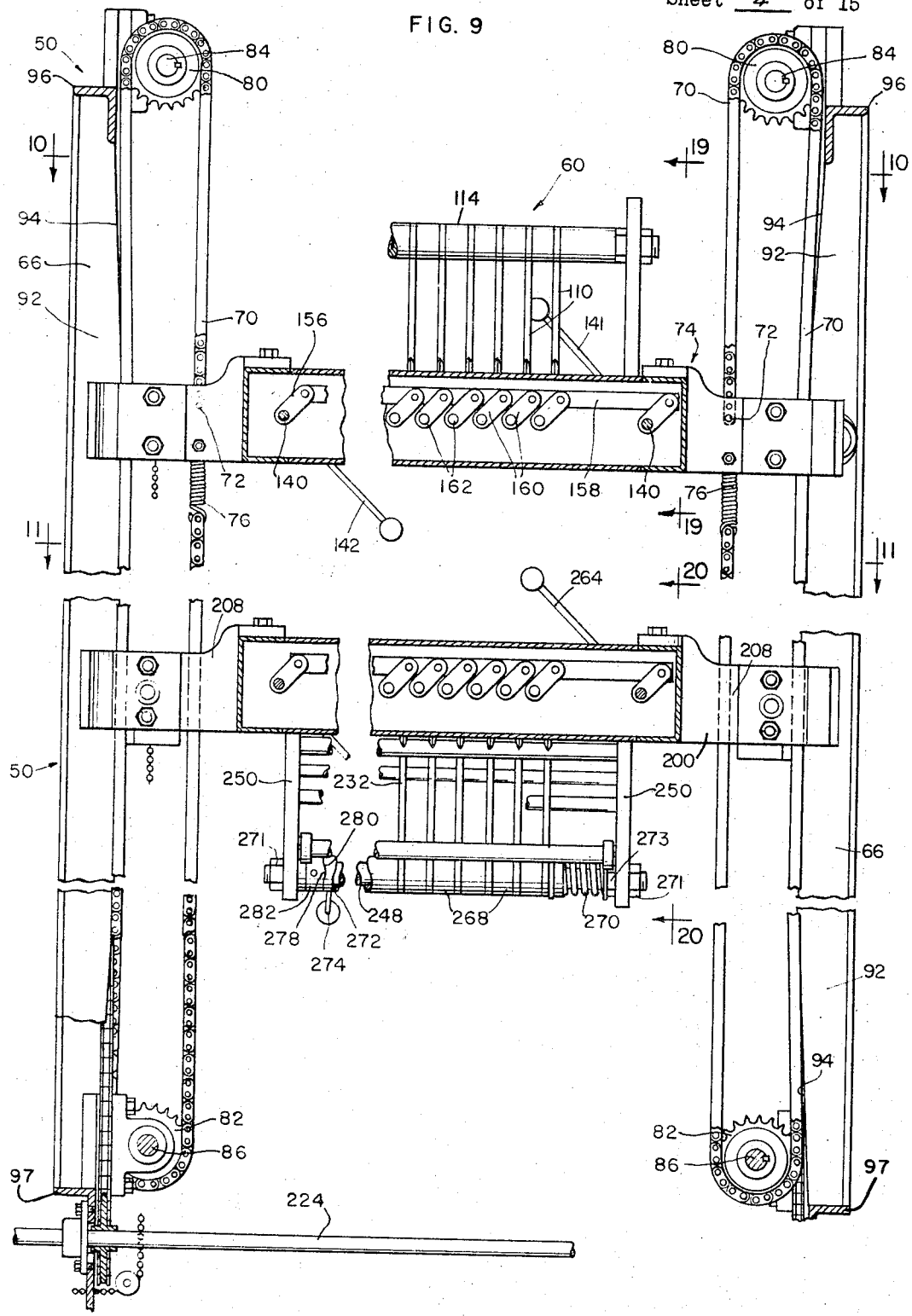

Jan. 28, 1969    F. G. GETCHELL ET AL    3,424,356
DRAPERY PLEATING, FINISHING AND SIZE CONTROL MACHINE
Filed June 5, 1963
FIG. 10
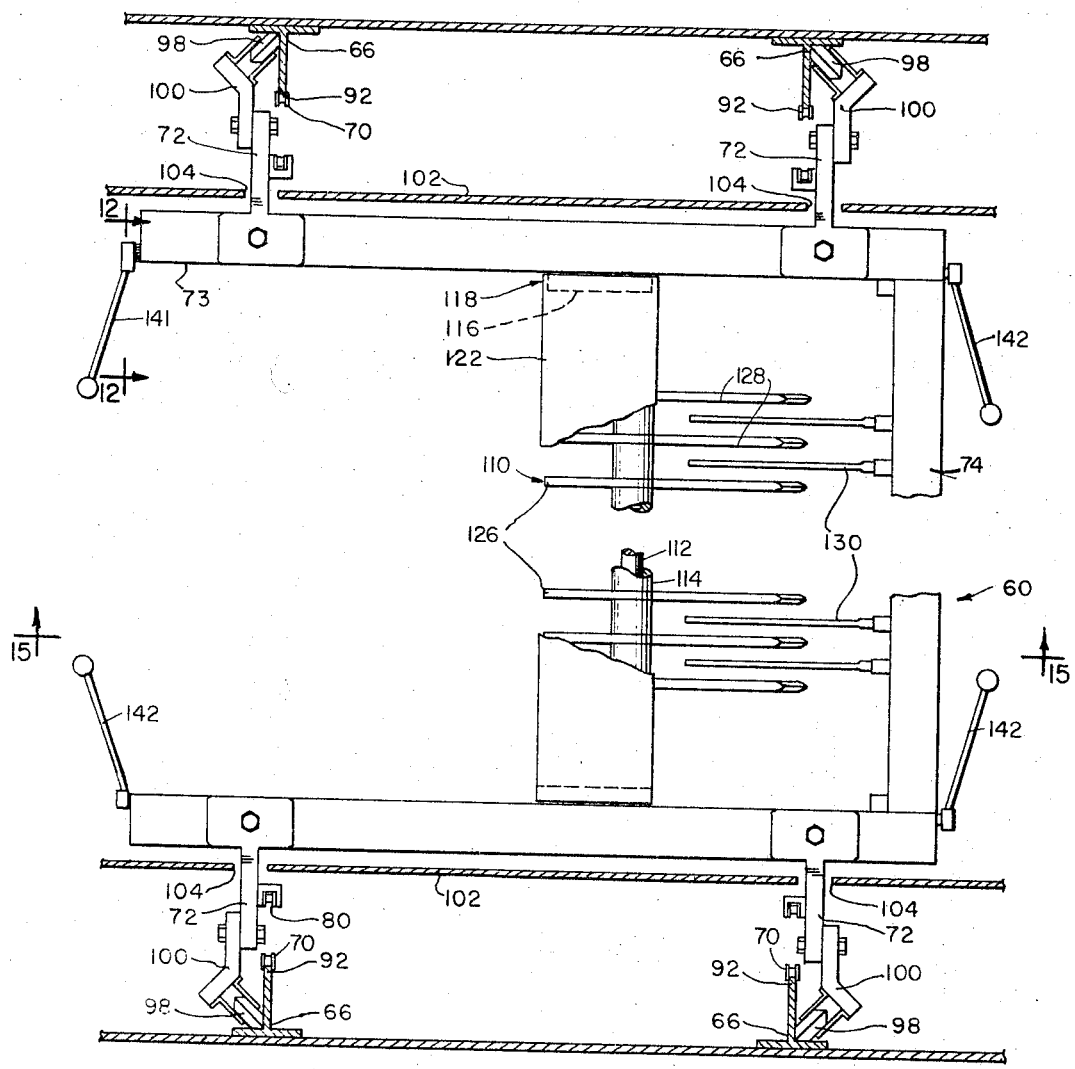
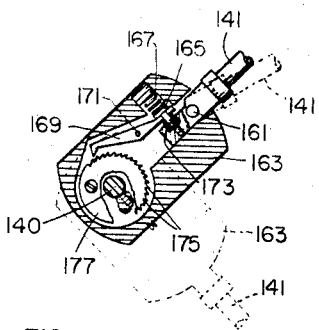
FIG. 12

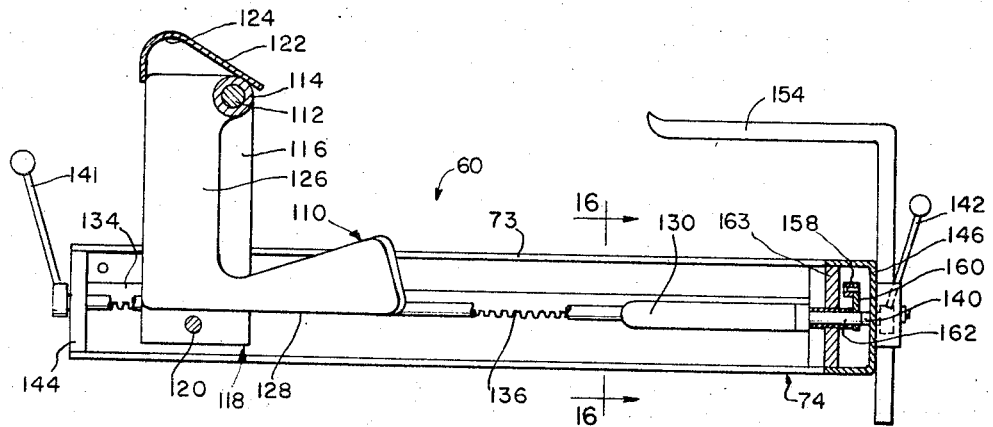
FIG. 15
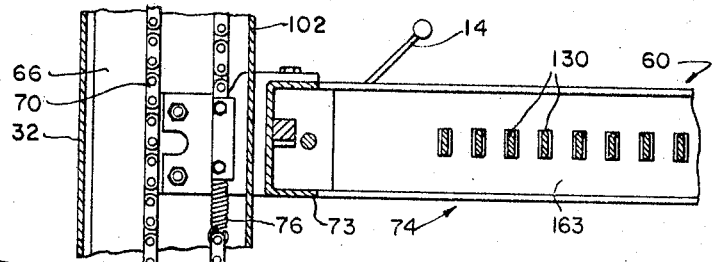
FIG. 16
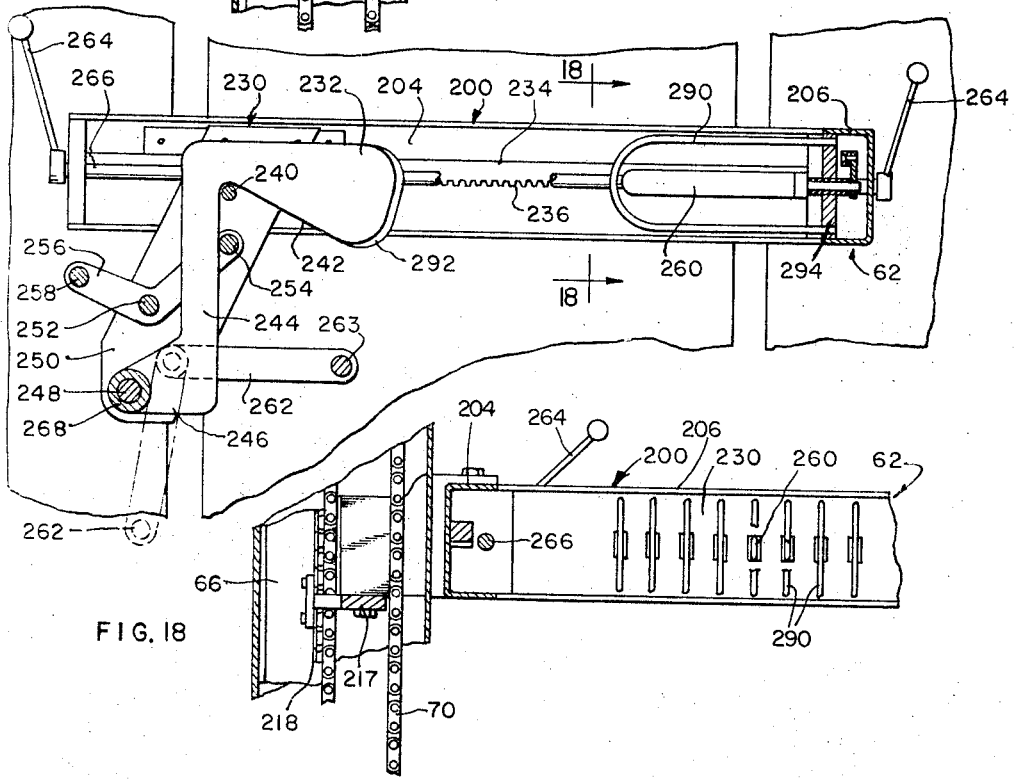
FIG. 17
FIG. 18

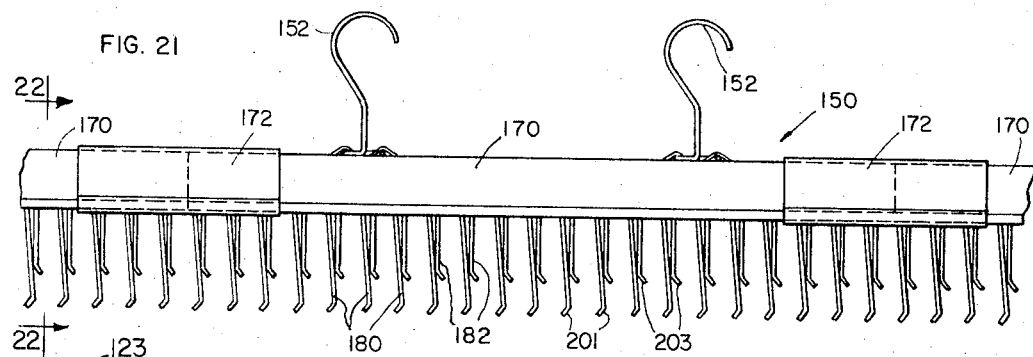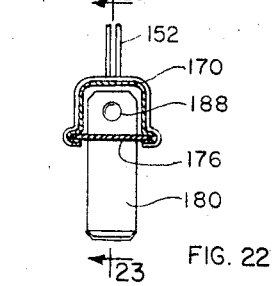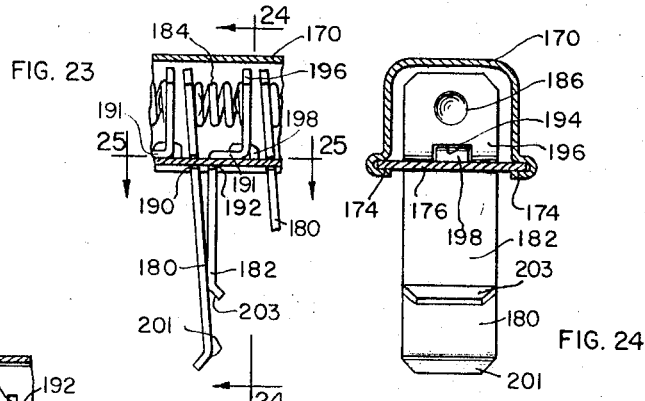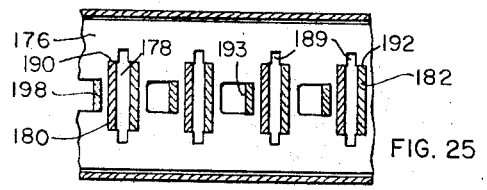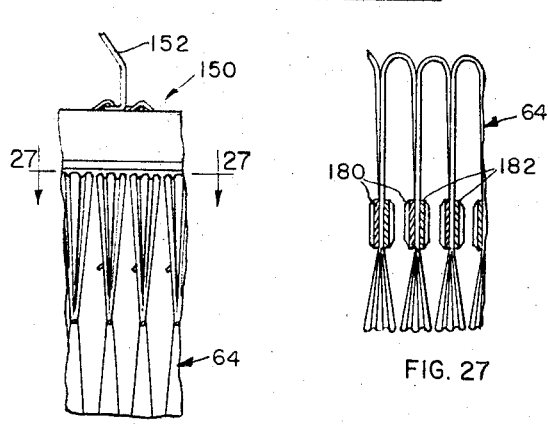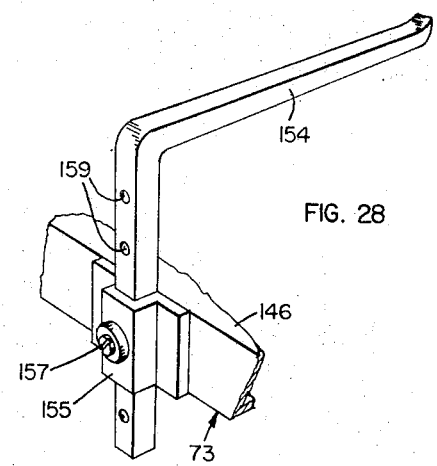

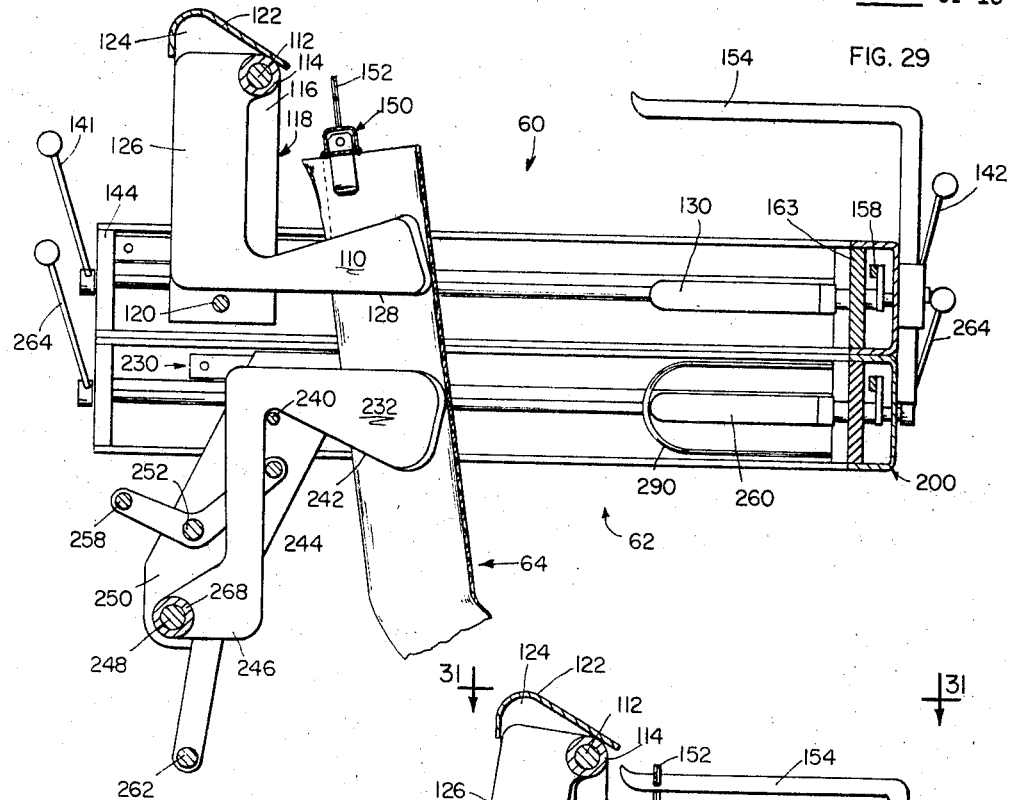
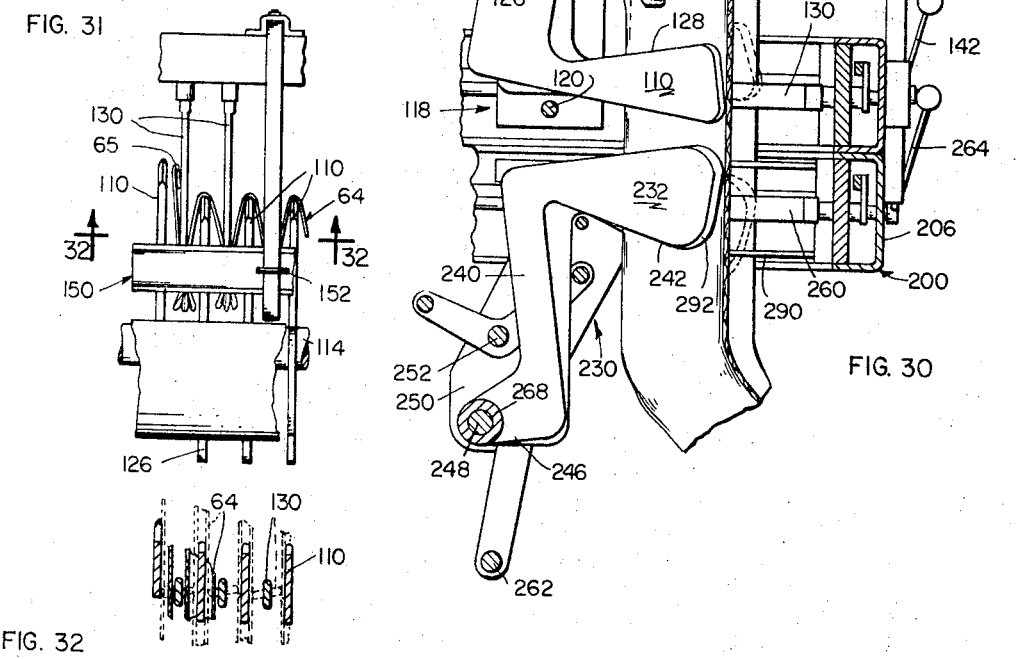

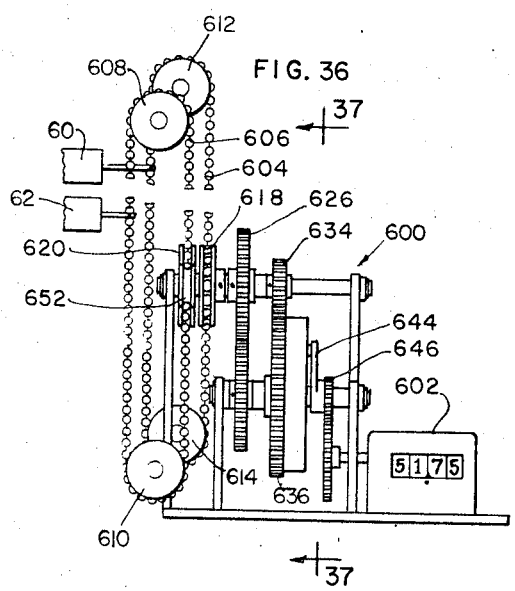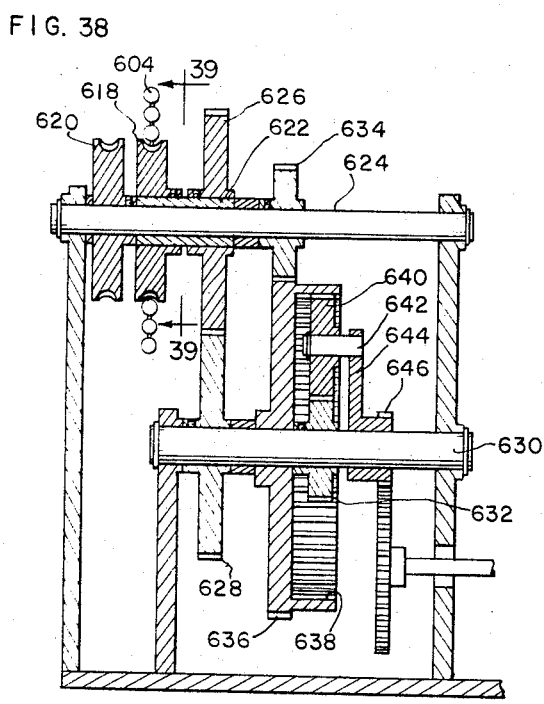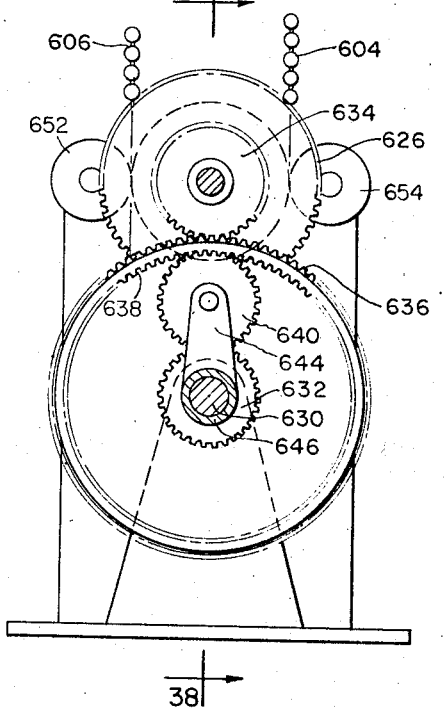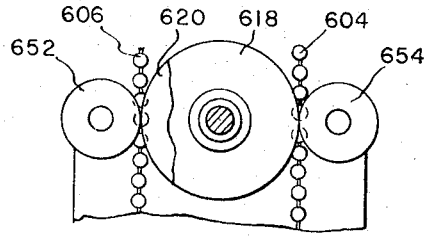

United States Patent Office 3,424,356
Patented Jan. 28, 1969

3,424,356
DRAPERY PLEATING, FINISHING AND
SIZE CONTROL MACHINE
Frederick G. Getchell, James W. Getchell, and Harold K. Trunnell, Eugene, Oreg., assignors, by mesne assignments, of one-half each to Northwest Science Investment Corporation and Preferred Growth Capital Inc.
Filed June 5, 1963, Ser. No. 285,724
U.S. Cl. 223—32         27 Claims
Int. Cl. D06j 1/00; F26b 13/12; B31f 1/08

ABSTRACT OF THE DISCLOSURE

A table loader is placed in the pleating machine with the pleats started and pleater carriages move the drapery into paddles. The loader is hooked over hangers and paddles are turned to clamp the pleats with fingers. An upper pleater bar is raised at high speed and then lower paddles clamp the lower end of the drapery. Then the upper pleater bar is driven at a slow speed to stretch the drapery. Four chains traveling around sprockets keyed together by shafts raise and lower the upper pleater bar and prevent cocking thereof. Cables prevent cocking of the lower frame and counterweight balance the weight of a lower pleater bar.

---

This invention relates to a drapery pleating machine, and more particularly to a machine for pleating, finishing and size controlling draperies.

An object of the invention is to provide an easily loaded, cabinet type drapery pleating machine.

Another object of the invention is to provide a power operated drapery stretching and pleating machine.

A further object of the invention is to provide a machine for automatically stretching, steaming and drying a pleated drapery.

Yet another object of the invention is to provide a pleating machine together with a table loader which is adapted to thread a drapery in pleated form into the pleating machine.

Still another object of the invention is to provide a pleating machine having pleating forming and clamping elements for engaging the ends of a drapery, holding the ends of the drapery in pleated form, and stretching the drapery therebetween, together with a removable loader which is adapted to suspend the drapery in pleated form during loading of the drapery in the drapery pleating elements.

A further object of the invention is to provide a drapery pleating machine having a measuring device for measuring the length in which a drapery is held in pleated condition.

Another object of the invention is to provide a drapery pleating cabinet having quick-opening doors in both the front and the rear thereof.

A further object of the invention is to provide a drapery pleating machine having a measuring device for measuring the length in which a drapery is held in pleated condition.

Another object of the invention is to provide a drapery pleating cabinet having quick-opening doors in both the front and the rear thereof.

Another object of the invention is to provide a drapery pleater bar having a first comb-like element, together with a second comb-like element carrying floating pleating fingers adapted to interleave the fingers of the first element, and provided with indicating means for indicating the extent of interleaving of each of the floating pleating fingers with the fingers of the other element.

Yet another object of the invention is to provide a drapery pleating machine having a pair of vertically disposed loader bars with the upper bar selectively power driven betweten a lower loading position and an upper drapery stretching position, and including a high speed drive for moving the upper pleater bar from its loading position substantially to the stretching position thereof, and a low speed drive for moving the upper pleater bar to the stretching position thereof.

The invention provides a drapery pleating machine having a lower pleater bar and an upper pleater bar movable along a vertical guideway between an upper stretching position and a lower loading or threading position adjacent the lower pleater bar. The pleater bars are provided with opposed comb-like fingers which are movable between open positions in which a table loader holding a drapery in pleated form is manipulated to thread a drapery in pleats through both the upper and the lower pleater bars, then the upper pleater bar is movable to a closed position clamping the pleats and the lower pleater bar is moved to a closed, non-clamping but pleating condition in which fingers thereof interleave to form the pleats but the drapery is slidable freely therethrough. Power means are provided for driving the upper pleater bar upwardly relative to the lower pleater bar to draw the drapery in pleated form through the lower pleater bar until the lower end thereof arrives at the lower pleater bar, at which time the movement of the upper pleater bar is stopped. The lower pleater bar then is actuated to clamp the lower portion of the drapery while in pleated form and low speed power means then is actuated to move the upper pleater bar slowly away from the lower pleater bar to stretch the drapery. Preferably measuring means are provided to measure and indicate the exact length of the drapery as it is stretched between the two pleater bars, and when the desired length is reached the movement of the upper pleater bar is stopped. Preferably the pleater bars are closed within a cabinet having doors thereto, and, after the drapery has been inserted and stretched, the doors are closed and the drapery is steamed while in pleated, stretched condition, after which hot air is blown through the cabinet and the drapery therein to dry the drapery in its stretched, pleated condition.

A complete understanding of the invention may be obtained from the following detailed description of pleating machines forming specific embodiments thereof, when read in conjunction with the appended drawings, in which:

FIG. 9 is an enlarged, fragmentary, vertical sectional view of the pleater bars and a drive therefor of the pleating machine of FIG. 1;

FIG. 10 is an enlarged, fragmentary, vertical sectional view taken along line 10—10 of FIG. 9 and turned 90°;

FIG. 12 is an enlarged, vertical sectional view taken along line 12—12 of FIG. 10;

FIG. 15 is an enlarged, vertical sectional view taken along line 15—15 of FIG. 10 with parts thereof shown in different positions;

FIG. 16 is an enlarged, fragmentary, vertical sectional view taken along line 16—16 of FIG. 15;

FIG. 17 is an enlarged, fragmentary, vertical sectional view taken along line 17—17 of FIG. 11 with parts thereof shown in different positions;

FIG. 18 is an enlarged, fragmentary, vertical sectional view taken along line 18—18 of FIG. 17;

FIG. 21 is an enlarged, fragmentary, front elevation view of a table loader forming a portion of the pleating machine of FIG. 1;

FIG. 22 is an enlarged, vertical sectional view taken along line 22—22 of FIG. 21;

FIG. 23 is an enlarged, fragmentary, vertical sectional view taken along line 23—23 of FIG. 22;

FIG. 24 is an enlarged, fragmentary, vertical sectional view taken along line 24—24 of FIG. 23;

FIG. 25 is an enlarged, fragmentary, horizontal sectional view taken along line 25—25 of FIG. 23;

FIG. 26 is an enlarged, fragmentary, front elevation view of the table loader of FIG. 21 with a drapery held thereby;

FIG. 27 is an enlarged, horizontal sectional view taken along line 27—27 of FIG. 26;

FIG. 28 is an enlarged, fragmentary, perspective view of a supporting arm of the pleating machine of FIG. 1;

FIG. 29 is an enlarged, fragmentary, vertical sectional view of the pleater bars with a drapery being threaded thereinto;

FIG. 30 is a view similar to FIG. 29 with a drapery threaded therein;

FIG. 31 is an enlarged, horizontal sectional view taken along line 31—31 of FIG. 30;

FIG. 32 is an enlarged, vertical sectional view taken along line 32—32 of FIG. 31;

FIG. 36 is a schematic view of the pleating machine with a drapery length measuring device forming an alternate embodiment of the invention;

FIG. 37 is an enlarged, vertical sectional view taken along line 37—37 of FIG. 36;

FIG. 38 is an enlarged, vertical sectional view taken along line 38—38 of FIG. 37;

FIG. 39 is a fragmentary, vertical sectional view taken along line 39—39 of FIG. 38;

Figure 2:
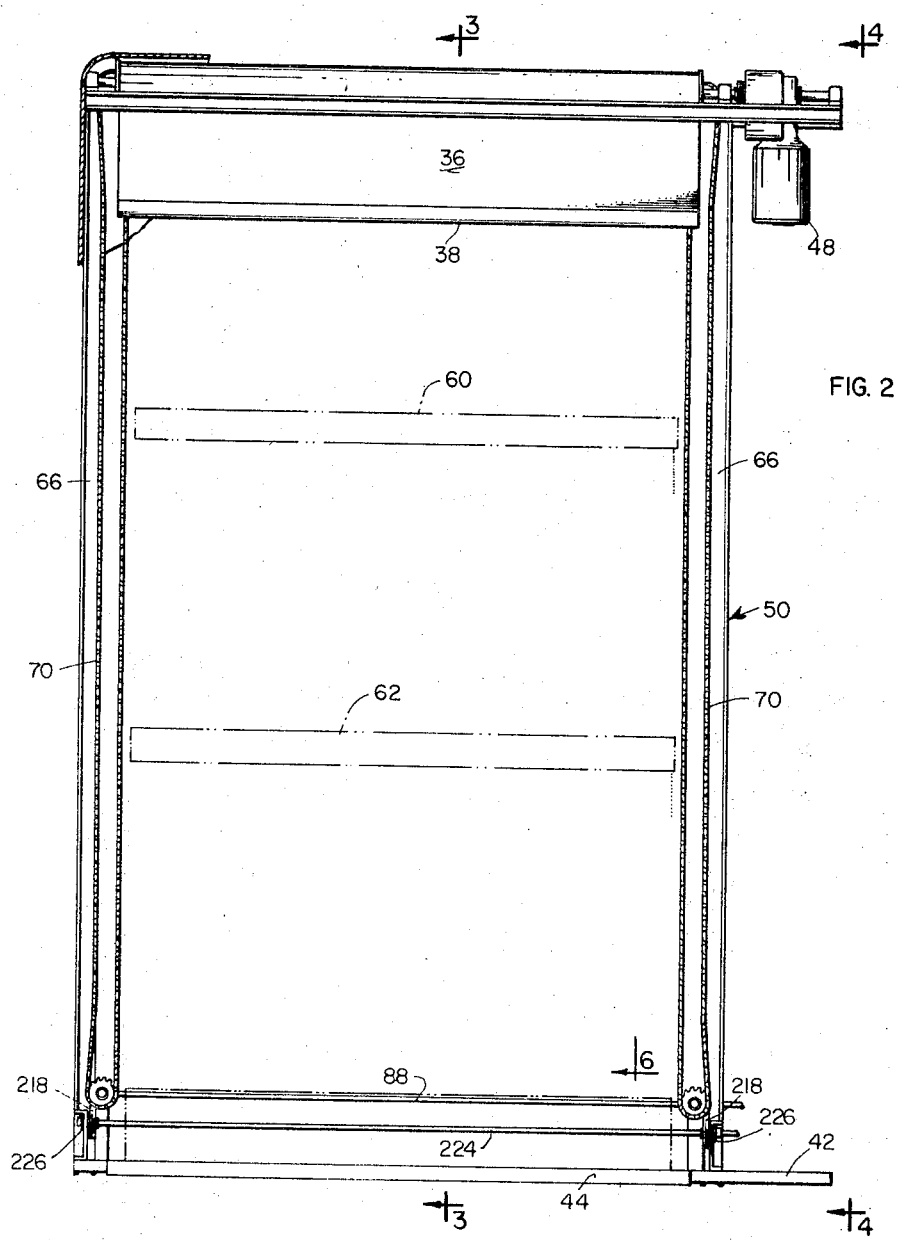
FIG. 2 is a front elevation view of the frame of the draper pleating machine of FIG. 1, with portions of the machine omitted for simplification.
Figure 3:
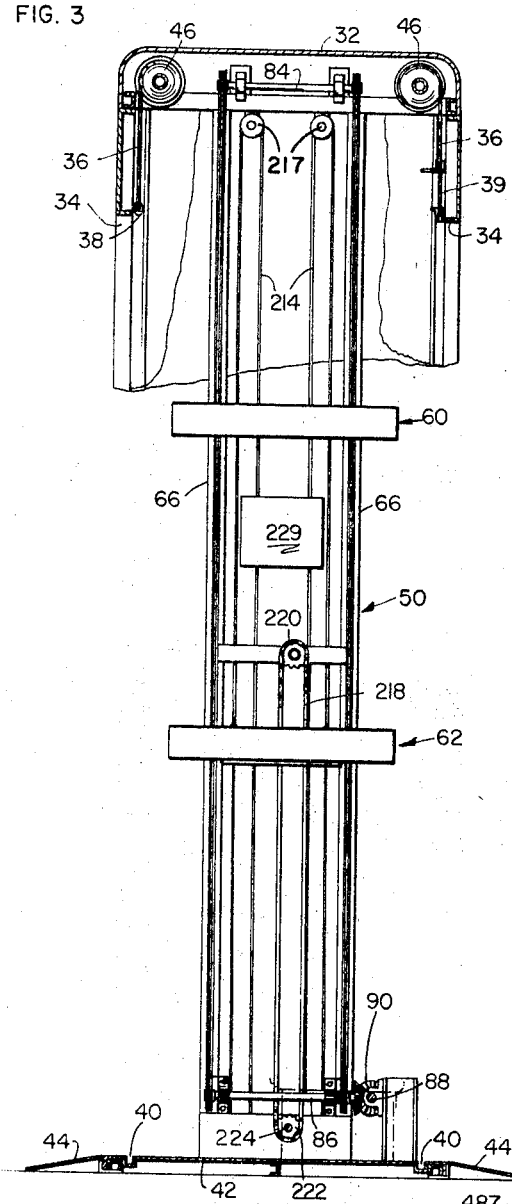
FIG. 3 is a vertical sectional view taken along line 3—3 of FIG. 2.
Figure 4:
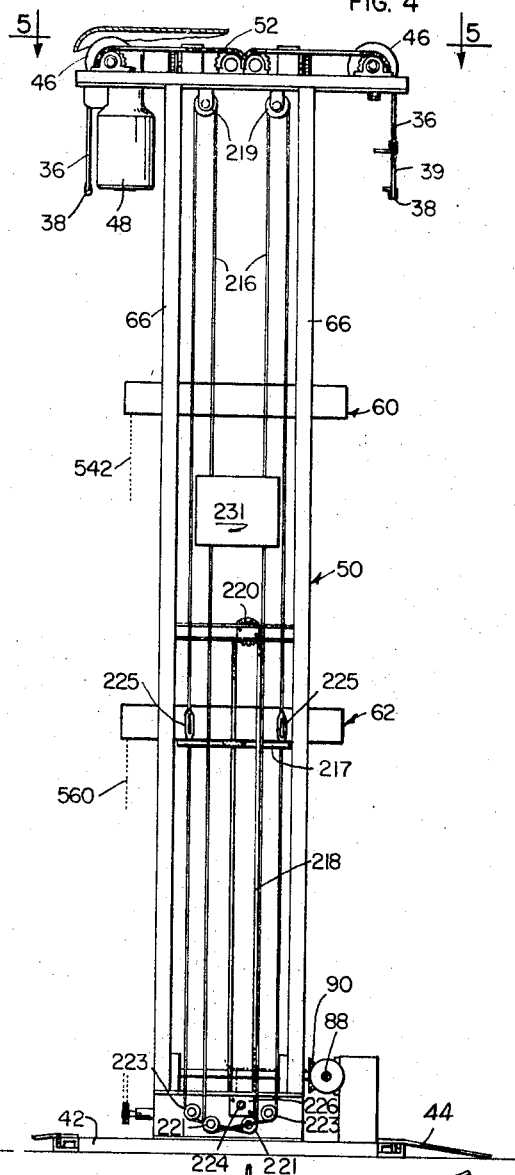
FIG. 4 is an elevation view taken along line 4—4 of FIG. 2.
Figure 5:
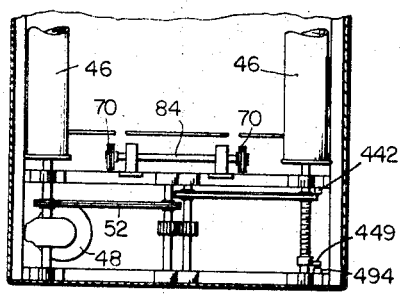
FIG. 5 is a fragmentary, horizontal sectional view taken along line 5—5 of FIG. 4.
Figures 6, 7:
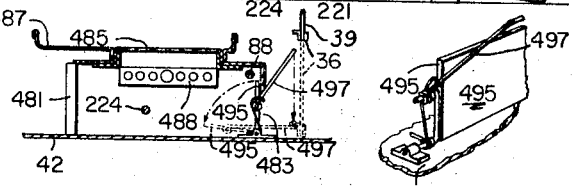
FIG. 6 is an enlarged, fragmentary, vertical sectional view taken along line 6—6 of FIG. 2.
FIG. 7 is a schematic, perspective view of a portion of the mechanism shown in FIG. 6.
Figure 11:
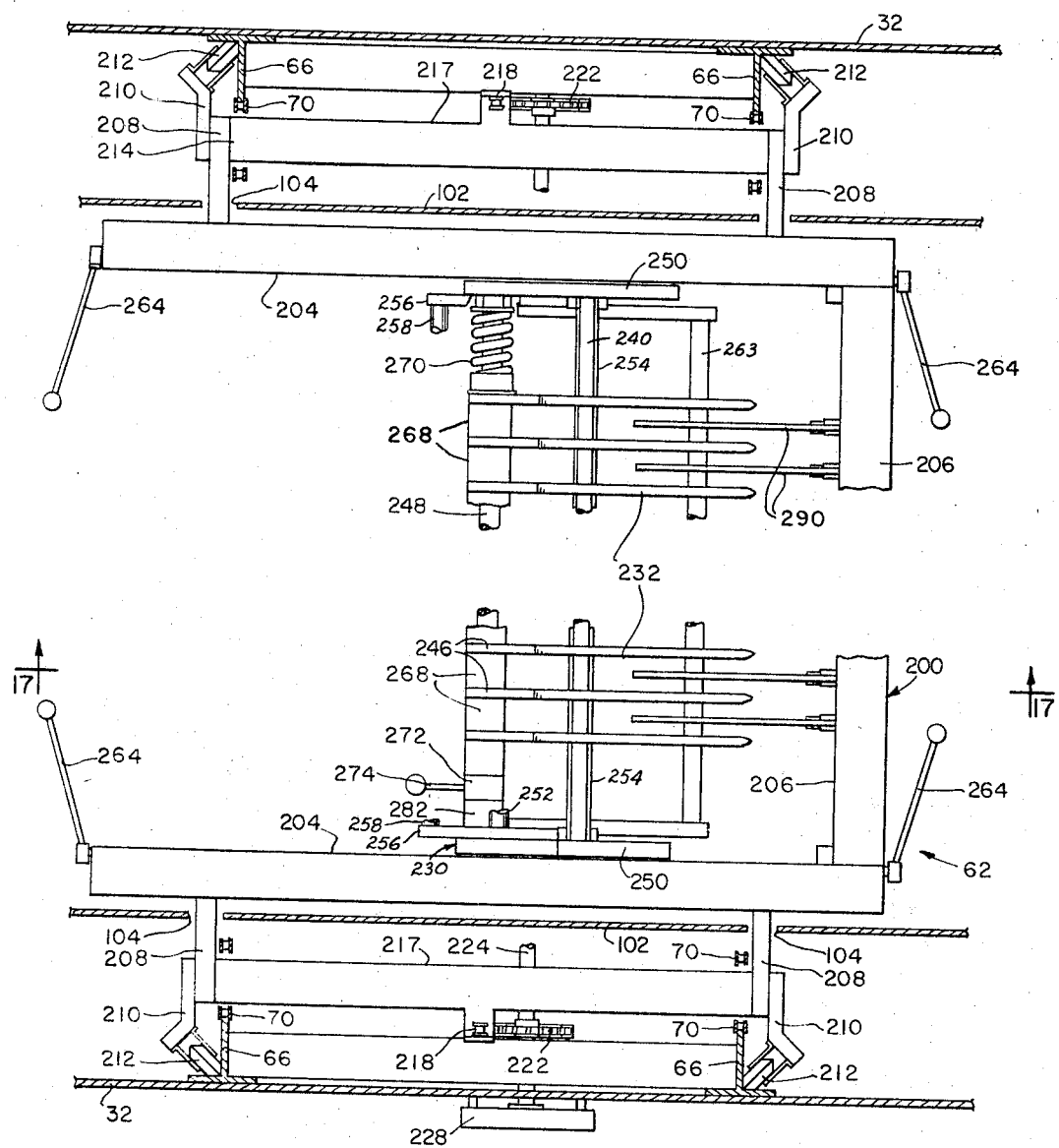
FIG. 11 is an enlarged, fragmentary, horizontal sectional view taken along line 11—11 of FIG. 9 and turned 90°.
Figure 13:
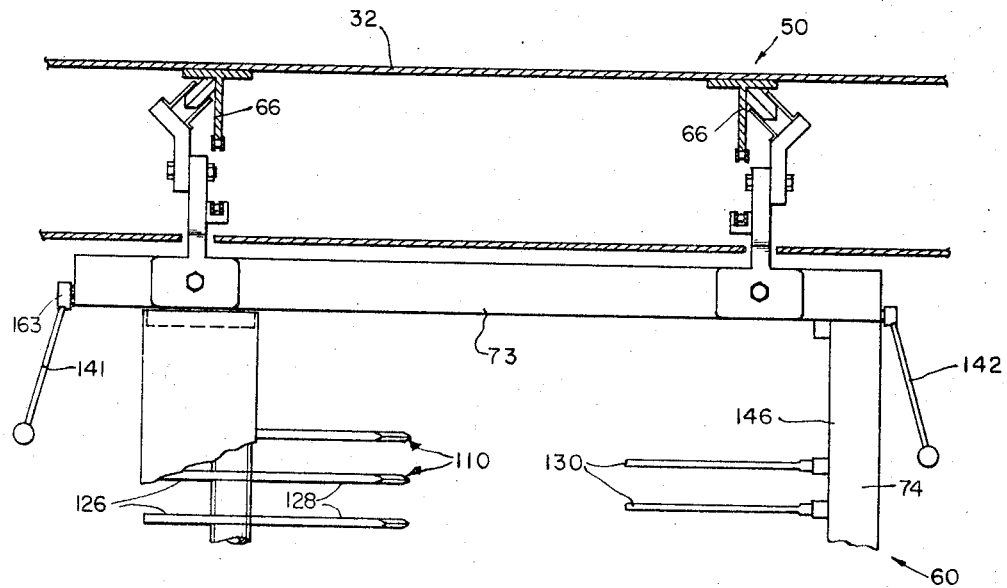
FIG. 13 is an enlarged, fragmentary, horizontal sectional view similar to FIG. 10 but with parts thereof shown in different positions.
Figure 14:
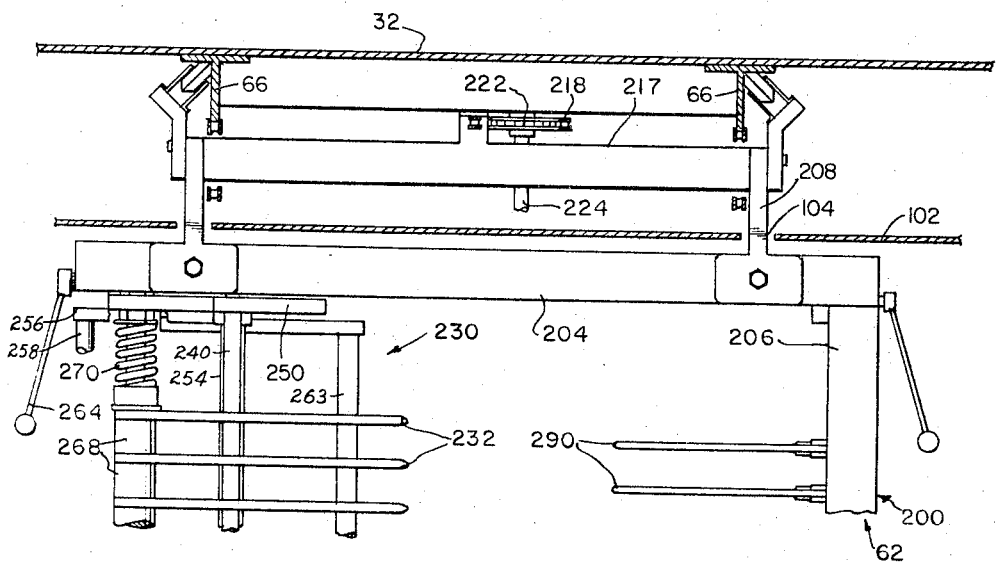
FIG. 14 is an enlarged, fragmentary, horizontal sectional view shown in different positions.
Figure 19:
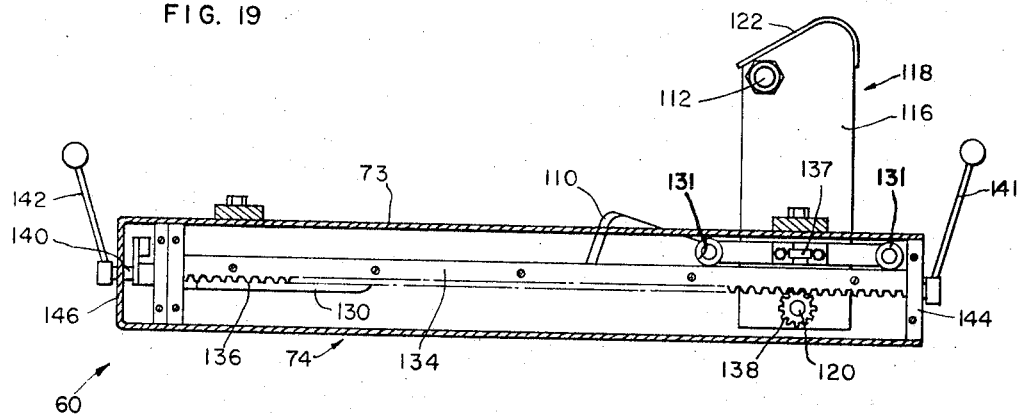
FIG. 19 is an enlarged, vertical sectional view taken along line 19—19 of FIG. 9.
Figure 20:
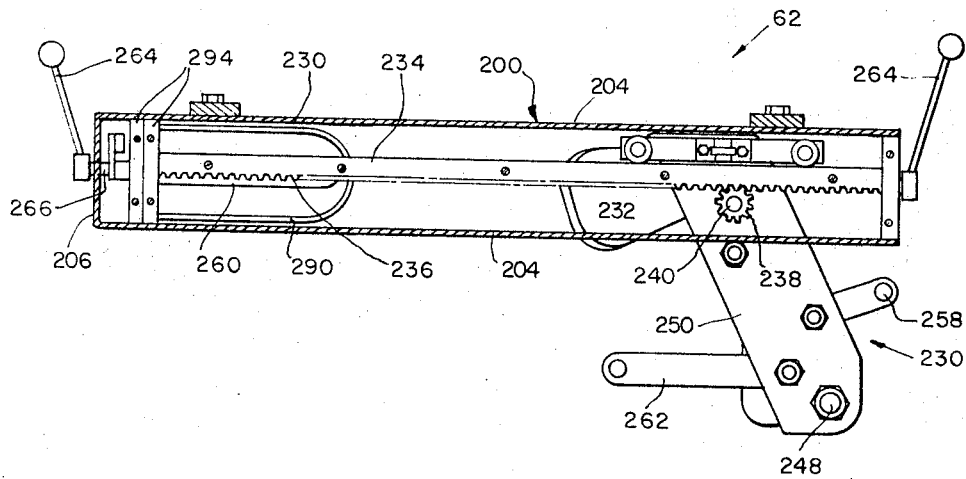
FIG. 20 is an enlarged, fragmentary, vertical sectional view taken along line 20—20 of FIG. 9.
Figure 33:
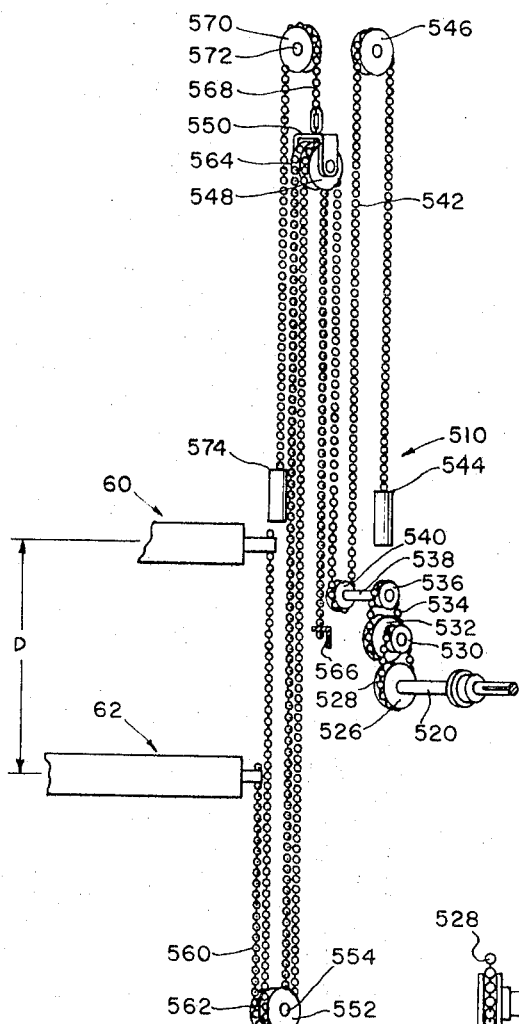
FIG. 33 is a fragmentary, schematic view of a measuring device of the pleating machine of FIG. 1.

Referring now in detail to the drawings, a drapery pleating machine 30 (FIGS. 1 to 35) forming one embodiment of the invention includes a cabinet 32 having front and rear doorway openings 34 (FIGS. 1, 2 and 3) and power-operated flexible doors 36 composed of moisture-impervious, tough, resilient material such as, for example, polymerized chloroprene, are provided for closing the openings 34. The doors 36 are provided at their lower ends with stiff bars 38 adapted to seat in channels 40 (FIG. 3) in a base 42 of the machine to completely close the openings 34 at the front and rear of the cabinet 32 except for a screen inlet 39 (FIGS. 3 and 4) in the lower end of the righthand door. The base 42 is provided with inclined ramps 44 to permit walking onto the base 42. Take-up rolls 46 are adapted to roll the doors 36 upwardly to open the doors when desired, and the rolls 46 are driven by an electric motor 48. The back door 36 has the screen inlet 39 (FIGS. 4 and 6) at the bottom thereof. The rolls 46 and the motor 48 are positioned inside the cabinet 32 at the top of a main frame 50 of the machine, and are interconnected by a chain and gear drive 52 so that the doors 36 move in synchronism with each other. The cabinet has at the righthand side thereof, as viewed in FIG. 1, an enlarged, power and control compartment separated from the main portion of the cabinet, and at the top of the cabinet 32 there is provided a fan 54 having an inlet 56 and adapted to pump air or other gases from the interior of the cabinet through an outlet 58 to the atmosphere at the exterior of the cabinet 32.

Figure 1:
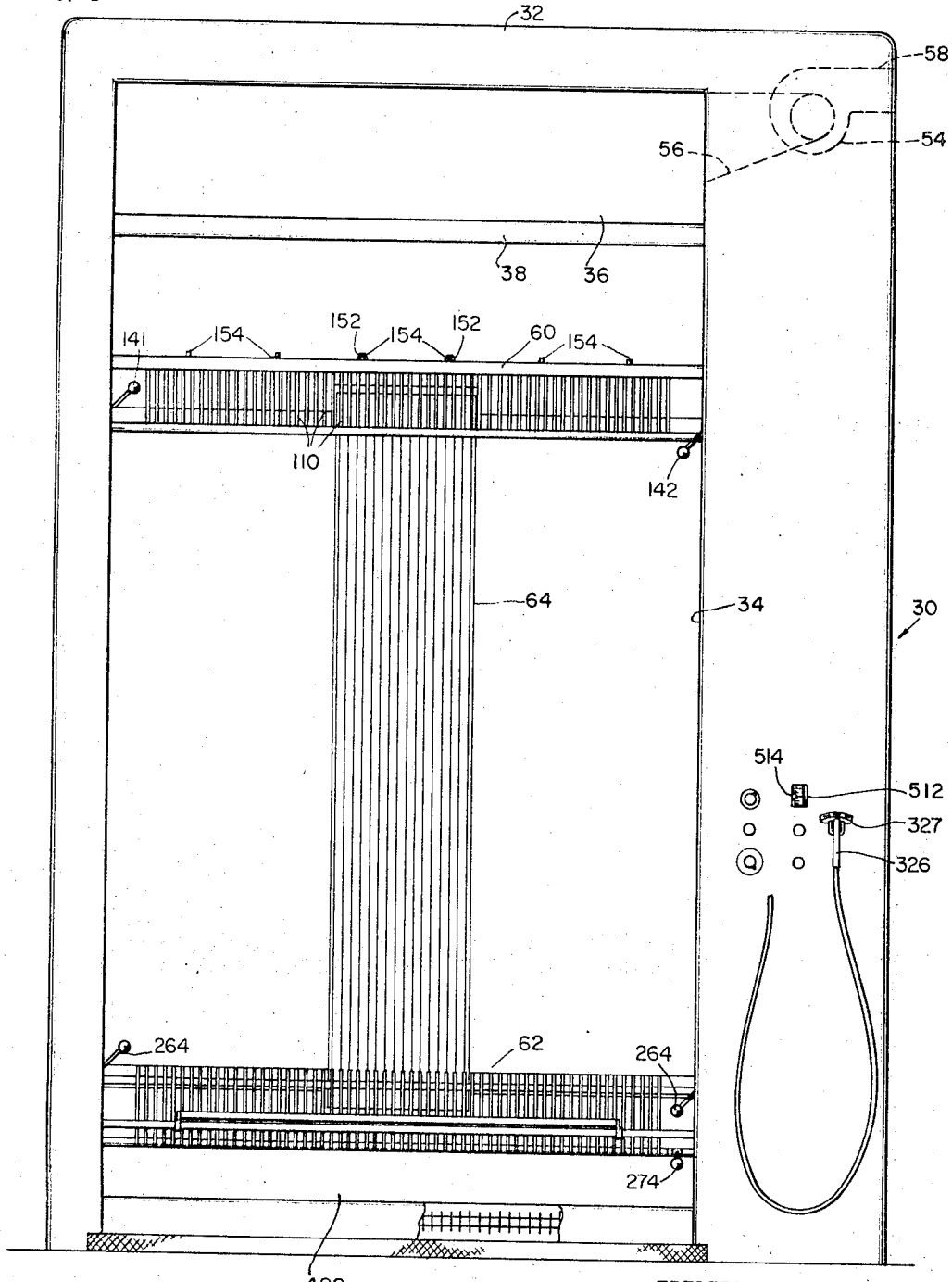
FIG. 1 is a front elevation view of a pleating machine forming one embodiment of the invention with portions broken away for clarity.

As illustrated in FIG. 1, an upper pleater bar 60 and a lower pleater bar 62 are provided for holding a drapery 64 in a stretched, pleated condition while the drapery is finished, steamed and dried while within the cabinet. The upper pleater bar 60 is power driven up and down the frame 50, which has four vertical T-bars 66 forming a guideway, and the lower pleater bar 62 is movable along this guideway manually, and may be locked in any desired position near the lower end of the guideway. The pairs of T-bars 66 serve to guide four chains 70 (FIGS. 9 and 10). One end of each chain 70 is fastened to rigid arms 72 extending from the ends of a rigid U-shaped pleater bar frame 74 of the pleater bar 60, and the other end of each chain 70 is connected to a tension spring 76 fixed to one of the arms 72. Thus, the chains 70 are made, in effect, endless, and the chains course over upper sprockets 80 and lower sprockets 82.

The sprockets 80 and 82 are keyed to shafts 84 and 86, respectively, and are driven by the shafts 86 through a shaft 88 and beveled gears 90 (FIG. 3) to drive all four chains 70 in synchronism and keep the frame 74 in a horizontal position and raise and lower the frame 74 as it travels along the T-bars 66. The stems 92 of the T-bars 66 are engaged by the rollers of the chains 70 (FIG. 10), and the side links of the chains 70 bracket the stems 92 to guide the chains 70 in vertical paths. The stems 92 are provided with tapered or relieved end portions 94 (FIG. 9), and the T-bars are secured together by cross-frame members 96 and 97 located at the tops and bottoms thereof to form a rigid framework therewith. To prevent lateral horizontal movement of the pleater bar frame 74, there is provided, as illustrated in FIG. 10, a plurality of beveled rollers 98 carried by brackets 100 secured to the rigid arms 72. The beveled rollers 98 fit into the inside corners of the T-bars 66 and roll therealong to prevent shifting of the frame 74 in any horizontal direction relative to the T-bars. The chains 70, being all driven in synchronism, keep the frame 74 from tilting relative to the horizontal. Covering walls 102 (FIG. 10) are provided with vertically extending slots 104 to provide clearance for the arms 72 and enclose the chains, T-bars, the sprockets 80 and 82 and shafts 84 and 86.

The upper pleater bar 60 (FIGS. 9, 10 and 15), includes a plurality of plate-like, generally L-shaped fingers 110 individually pivotally suspended from a rod 112 and separated by spacer sleeves 114. The rod 112 is carried by arms 116 of a carriage or carrier 118 also including a shaft 120 and a cover plate 122 having a recess or clearance portion 124 to permit pivotal movement of the fingers 110 in a clockwise direction, as viewed in FIG. 15. The fingers 110 are generally L-shaped and are so shaped as to be counterweighted by arm portions 126, which normally hang vertically to the left of the rod. Finger portions 128 normally extend substantially horizontally between the spaces between equidistantly spaced pleating paddles 130.

The carriage 118 (FIG. 19) is supported by two pairs of rollers 131 which ride along the tops of horizontally disposed bars 134 having racks 136 formed on the lower edges thereof and supported in the channel-like arms 73 of the frame 74. An end thrust roller 137 is provided on each end of the carriage 118. Mounted on the two end portions of the shaft 120, which is journaled in the lower ends of the arms 116 and keyed thereto, are pinions 138 which mesh with the racks 136 carried by the arms 73. The racks and pinions prevent cocking of the carriage 118 relative to the frame 74. Paddle-actuating shafts 140 have handles 141 and 142 at the front and rear of the frames 74 at all four corners of the frame 74. The shafts 140 are journaled in end plates 144 and base 146 of the frame 74. The racks 136 and pinions 138 are locked together for rotation to prevent cocking of the carriage relative to the frame 74.

The carriage 118 may be moved from an open position relative to the fingers 130 to the right, as viewed in FIG. 29, to positions in which the fingers 110 interleave the paddles 130 for pleating the drapery 64 as shown in FIG. 30. As the carriage 118 is pushed manually from its retracted or threading position, as shown in FIG. 29, to the interleaving pleating position thereof in which the fingers 110 push the drapery 64 in pleated condition between the paddles 130, the upper end of the drapery is held in a pleated position by a table loader 150. After the carriage is closed, the table loader is suspended by hooks 152 thereof from supporting brackets or hangers 154 carried by the carriage 118. The brackets 154 are held at selected positions, all the same distance above the frame 73, by guides 155 (FIG. 28). Detents 157 have spring-pressed detent balls (not shown) each adapted to enter any selected one of detent sockets 159 in the hangers. The fingers 110 enter between the paddles 130 to the extent permitted by the width of the pleats formed in the drapery, and then pivot clockwise, as viewed in FIG. 30, as determined by the resistance of the drapery 64. The back sides of the arm portions 126 of those of the fingers 110 which are in the pleats project upwardly and to the left, as illustrated in FIG. 30, and if all of the pleats are of uniform width the upper lefthand edges of the fingers 110 will be even and lie in the same plane. However, if the pleats of the drapery are not of uniform width some of the arm portions 126 will project farther to the left than the others, and the operator may push on those arm portions 126 until all of the pleats are of uniform width, which will be indicated by the lefthand edges of the arms 126 lying in the uniform plane. To clamp the pleats of the drapery in pleated positions, the operator grasps the handle 141 of FIG. 12, and turns the handle 141 to turn the paddles 130 into positions clamping the pleats of the drapery against the fingers 110. The paddles 130 are generally elliptical in cross section, as illustrated best in FIG. 11, and turning of the handle 141 turns crank arms 156 (FIG. 9) keyed to the shafts 140 to move a link 158 connected to crank arms 160 keyed to shaft portions 162 journaled in plate 163 (FIG. 15) carried by the frame 74. This rotates each of the paddles 130 on the longitudinal axis thereof to a position clamping the portions of the pleat of the drapery on each side thereof firmly against the fingers 110 interleaved with the paddles 130.

The handle 141 (FIG. 12) is pivoted by a pin 161 to a hub 163 keyed to one of the shafts 140. As the handle 141 is turned clockwise, as viewed in FIG. 12, it swings the shaft 140 therewith to turn the paddles 130 (FIG. 16) to tightly clamping positions, each paddle 130 being wider than the space between the fingers 110 interleaved therewith so that the pleated portions of the drapery are tightly clamped. As the handle 141 (FIG. 12) is so turned, it moves upwardly a headed screw 165 carried by hub 163 and moves through spring 173 a locking pawl 169 counterclockwise on a pin 171 carried by the hub. The spring 173 urges the pawl into engagement with tooth 175 of ratchet wheel 177 fixed to an end wall of the arm 73 (FIG. 13) of frame 74. At the end of the clamping movement of the hub 163 (FIG. 12), the pawl engages one of the teeth 175 to lock the hub 163 and shaft 140 in their clamping positions. Release of the clamping is effected by swinging the handle 141 counterclockwise to swing the pawl clockwise out of engagement with the tooth 175 and the spring 167 holds the pawl in this releasing position until the handle 141 is again turned clockwise. The handles 142 (FIG. 10) are keyed rigidly to the shafts 140, do not operate or release the pawl, and serve to preliminarily turn the shafts 140 to clamping positions.

The table loader 150 (FIGS. 21 to 27) comprises a plurality of channels 170 detachably secured together by channel connectors 172 fitting over the channels 170 and frictionally holding them in end-to-end relationship to form the multi-channel length table loader. Each channel 170 has grooves 174 in the sides of the channel in which a mounting plate 176 slidably and frictionally fits. The mounting plate 176 has positioned therein slots 178 spaced therealong at a distance equal to the distance between the pleats of the drapery. Through each of the slots 178 project a movable clamping plate 180 and a fixed clamping plate 182. The plates 180 are urged toward the plates 182 by compression springs 184 seated over centering buttons 186 and 188 formed in the plates 180 and 182. The plates 180 are provided with side notches 190 fitting over the ends of the slot 188 and of such a width as to permit the plates 180 to pivot freely toward and away from the plates 182. The slots have elongated central portions 189 to permit insertion of the plates 180 and 182 through the slots. The width of the notches 178 is sufficient relative to the thickness of the plates 182 and 180 to permit the upper edge of the drapery to be positioned between the plates 180 and 182 and clamped securely therebetween. The fingers 182 have L-shaped inner portions 196 which are positioned in the channel, base portions 191 seating on the plate 176. The fingers 182 are also provided with retaining notches 192 and have openings 194 positioned in arms of the portions 196. The openings 194 are adapted to receive retaining fingers or hooks 198 punched from the mounting plate 176 and holding the base portions 191 of the plates 182 tightly against the plate 176. The fingers 198 also hold the base portions 191 of the plates 182 against pivoting relative to the mounting plate 176. The slots 178 are sufficiently wide to permit insertion of the plates 182 under the fingers or tabs 198. The plates 180 and 182 are provided with outwardly flared end portions 201 and 203. The table loader 150 may be hung over or positioned on a table and the tops of the pleats of the drapery may be inserted one after another into the several pairs of clamping plates 180 and 182 to hold the upper ends of the drapery in pleated positions, and then the table loader 150 may be lifted with the draperies and placed in the pleating machine. Preferably, several table loaders 150 are provided for one pleating machine, the table loaders 150 also serving to hang the drapes during storage and other processing operations thereon.

The lower pleater bar 62 (FIGS. 9, 11, 14, 17, 18, 29 and 30) is generally similar to the upper pleater bar 60 and is mounted in a horizontal position parallel to and directly below the upper pleater bar 60. The lower pleater bar 62 includes a U-shaped frame 200 having channel-like arms 204 and a base 206 with arms 208 projecting from the arms 204 through the slots 104 and carrying brackets 210 supporting bevel rollers 212 riding in the inner corners of the T-bars 66 to prevent sidewise or lengthwise shifting of the frame 200 relative to the T-bars 66 forming the frame of the machine.

To prevent cocking of the frame 200, cables 214 and 216 (FIGS. 3 and 4) are positioned in pairs at the opposite ends of the frame 200. The cables 214 (FIG. 3) course partially around pulleys 217 carried rotatably on fixed axes by the frame 50, and the cables 216 course partially around pulleys 219, 221 and 223 (FIG. 4) in paths identical with those of the cables 214. One end of each cable 216 is secured to the top of a turnbuckle 225 fixed at its lower end to one corner of the frame 200. The cable 216 extends upwardly from the turnbuckle 225, over the pulley 219 directly thereabove, downwardly to pulley 221, under pulleys 221 and 223 and upwardly to the other corner of the frame 200 to which corner that end of the cable 216 is fixed. Raising of one corner to which one end of one of the cables 216 is fixed raises the end of the other cable 216 fixed to that corner to pull up the other corner of the end of the frame 200 through the last-mentioned cable 216. Conversely, downward movement of one corner at that end of the frame 200 moves the other corner of that end of the frame downwardly. The cables 214 act identically relative to the corners at the other end of the frame 200. Thus, any turning or twisting movement of the frame 200 about the longitudinal axis thereof is prevented. To prevent any twisting or turning movement of the frame 200 about an axis transverse to the longitudinal axis thereof and to hold the frame 200 in any desired adjusted level, the frame 200 is secured to corresponding sides of chains 218 which are mounted on upper sprockets 220 and lower sprockets 222 (FIG. 3) mounted on the frame 50. The lower sprockets 222 are keyed to a shaft 224 to lock the sprockets 222 together for rotation, the shaft being mounted in bearings 226 and being connected to a braking mechanism 228 (FIG. 8) operable by the operator of the machine to lock the shaft 224 against rotation when desired, to hold the pleater bar 62 at any desired level. Counterweights 229 and 231 (FIGS. 3 and 4) fixed to cables 214 and 216, respectively, balance the weight of the pleater bar 62.

Pleater bar 62 is provided with a carriage or carrier 230 (FIGS. 11 and 17) carrying generally Z-shaped, individually pivoted fingers 232 thereon and movable along guides 234 having racks 236 with which pinions 238 (FIG. 20) keyed to shaft 240 carried by the carriage mesh to keep the carriage 230 always parallel to the base 206 of the frame 200. The fingers 232 include forward, wide, pleating finger portions 242, together with arm portions 244 and arm portions 246, which are mounted pivotally on a rod 248 extending between the arms 204 of the frame 200. The fingers 232 are urged by gravity in the clockwise direction, as viewed in FIGS. 12 and 30, toward the shaft 240. The shaft 248 is mounted between vertical plates 250 of the carriage 230, and rods 252 and 254 brace the plates 250 and carry arms 256 mounting a rod 258 adapted to be pushed or pulled by th eoperator for moving the carriage 230 toward or away from pleating paddles 260. A U-shaped gauge 262 having a rod 263 is pivoted on the plates 250 between an operative position adapted to gauge the length of the drapery to see that the bottom portion thereof is level, as shown in full lines in FIG. 17, and a retracted position in which it is maintained during threading of the drapery through the machine, as illustrated in broken lines in FIG. 17. The paddles 260 are generally similar to the paddles 130 and are actuated by structure identical with the above-described structure for actuating the paddles 130, and operable by handles 264 keyed to shafts 266.

Each of the fingers 232 is pivotal on the rod 248 and the fingers 232 are spaced apart by spacer sleeves 268. The fingers 232 and spacer sleeves 268 are slidable along the rod 248. As illustrated best in FIG. 11, the spacer sleeves 268 and fingers 232 are urged toward the left by a compression spring 270 toward a locking sleeve 272 having a handle 274 rigid therewith. The sleeve 272 is provided with cam recesses 278 (FIG. 9) therein adapted to receive complementarily shaped cam lobes 280 on a collar 282 pinned rigidly to the rod 248. Normally the fingers 232 are freely pivotal on the rod 248 but when the sleeve 272 is rotated by the handle 274 to a position in which the recesses 278 are not aligned with the lobes 280, the sleeves 268 and fingers 232 are slid to the right, as viewed in FIG. 9, sufficiently against the action of the spring 270 to frictionally clamp the fingers 232 against rotation, the rod 248 being held against rotation by nuts 271 and 273 clamping against the arms 250 of the carriage 230. The movement of the sleeves 268 and fingers 232 is not great, but it is sufficient to clamp the fingers 232 fairly tightly against rotation on the rod 248.

The carriage 238 is movable from a retracted position in which the fingers 232 are spaced away from the adjacent ends of the paddles 260 and U-shaped, stiff wire guards 290 (FIG. 17) fixed to plate 294 of the frame 200 to a pleating position in which the fingers 232 interleave with the paddles 260 and guards 290 with the paddles 260 in nonclamping or loosely clamping positions. In this position of the carriage 230, the drapery may be pulled upwardly through the interleaving fingers 232 and guards 290 and paddles 260. The fingers 232 are provided with rounded end portions 292 and the ends of the guards 290 are rounded to permit easy movement of the drapery while the upper pleater bar 60 is being raised relative to the lower pleater bar 62 while maintaining the drapery in pleated form as it travels through the lower pleater bar 62.

When the drapery has been raised to the desired height, upward movement of the upper pleater bar is stopped and one of the handles 264 is actuated manually to turn the paddles 260 to tightly clamping positions in which the edges of the paddles 260 clamp the drapery on opposite sides thereof against the adjacent blade-like fingers 232 to securely hold the drapery. The width of each of the paddles 260 is greater than the distance between adjacent ones of the fingers 232 plus twice the thickness of the drapery material. Thus, as the drapery is pulled relative to the fingers 232 and paddles 260, the drapery tends to pull one side edge of the paddles in a tightening direction to enhance the clamping effect and offset the tendency of the drapery on the other side edge of that paddle to pull the paddle 260 in a releasing direction. The frictional holding of the fingers 232 tends to maintain the fingers projected set distances between the paddles 260 as the drapery is being pulled upwardly therethrough. This forms the pleats in straight lines as the pleater bar 60 is moved upwardly in pulling the drapery upwardly through the pleater bar 62. The lefthand edges of those of the fingers 232 which are actually engaging the pleats of the drapery should lie in a plane when the pleats are all of an equal width or depth, which may be observed visually. If the lefthand edges of the arm portions 244 are not lying in a plane, the operator, prior to clamping the pleats by the paddles 260, manipulates the fingers 232 until the pleats are of equal width, as indicated by the lefthand edges of the arm portions 244 lying in a single plane.

*Loading*

The operator through the remote control switch 327 (FIG. 35) actuates the machine, if necessary, to lower the pleater bar 60 to a position adjacent the pleater bar 62 (FIGS. 29 and 30), and moves the pleater bars 60 and 62 to their open or threading positions. The operator then takes the loader bar 150, which has the drapery 64 therein, lays the drapery on the top of radiator 488 (FIG. 1), and moves the table loader 150 upwardly through the open pleater bars 62 and 60 to the position thereof shown in FIG. 29 in which the pleated upper end portion is interleaved with the fingers 232 and 110. The operator then rests the table loader 150 on the fingers 110 and moves the carriages 118 and 230 to their pleating positions shown in FIG. 30 in which the fingers 110 and 232 are interleaved with the paddles 130 and 260. Then, if necessary, the fingers 110 are so adjusted that the portions 126 of the pleater fingers 110 lie in the same plane, which indicates that the pleats are of equal depth, and then through the handle 141 turns the paddles 130 to their clamping positions. It should be noted that the fingers of the pleater bars entering fully the pleats of the drapery do not fully interleave the paddles and the fingers bracketing end or return pleats 65 (FIGS. 30 and 31) of the drapery hold the return pleats in flattened condition. Then the operator, after any necessary adjustment of the fingers 232 to insure that the pleats of the drapery as formed by the fingers 232 and paddles 260 are of uniform depth, moves the lower pleater bar 62 (FIGS. 5 and 12) to the level at which he desires it, and then actuates the high speed drive of the upper pleater bar 60 to move the upper pleater bar 60 upwardly relative to the lower pleater bar 62, and draws the drapery in pleated form through the lower pleater bar. When the upper pleater bar 60 arrives at approximately the desired position thereof, the drive thereof is stopped. The operative ones of the fingers 232 are again adjusted if necessary to even them, the paddles 260 are moved to lightly clamping positions, and the gauge 262 (FIG. 17) is swung from its ball spring-detented, retracted position to its operative position. The lower edge of the drapery is adjusted relative to the pleater bar 62 until the lower edge thereof lies evenly along the horizontal rod 263, and then one of the handles 264 is actuated to move the paddles 260 into full clamping positions. The low speed drive of the upper pleater bar 60 then is actuated and the bar 60 is raised slowly to stretch the drapery to the desired position, the pointer 514 indicating on the scale 516 the distance to which the drapery is stretched. The low speed drive of the pleater bar 60 then is stopped and the drapery is maintained in this stretched condition.

*Drapery measuring device*

To give a direct indication of the length of the drapery, there is provided a measuring device 510 (FIGS. 33 and 34) which has an indicating window 512 on the cabinet 32 (FIG. 1) with a pointer 514 indicating on a portion of a spiral scale 560 (FIG. 34) the length of the drapery stretched between the two pleater bars 60 and 62. The scale 516 is mounted in helical position in a helical groove 522 in a drum 518 splined to shaft 520. A fixed follower roller 524 projects into the groove 522 to move the drum 518 along the shaft 520 as the shaft and drum are rotated. The rotative position of the shaft 520 is determined by the distance separating the pleater bars 60 and 62. The shaft 520 is driven by a sprocket 526 keyed thereto and driven by a ball chain 528 which also meshes with sprocket 530 keyed to sprocket 532 driven by ball chain 534 driven by sprocket 536. The sprocket 536 is keyed to a shaft 538, as is sprocket 540, and the sprocket 540 is driven by a ball chain 542. A tensioning weight 544 is connected to one end of the chain 542 and the chain 542 extends from the tensioning weight 544 over an idler sprocket 546 mounted in a fixed position, under the sprocket 540, upwardly and over a sprocket 548 carried by a clevis 550, downwardly under a sprocket 552 mounted on an axle 554 on a fixed axis, and upwardly to the pleater bar 60 to which the other end of the chain 542 is secured. A second chain 560 is secured at one end to the lower pleater bar 62 and extends from the pleater bar 62 under a sprocket 562, which is freely rotatable relative to the sprocket 552 and is mounted on the axle 554. The chain 560 extends upwardly from the sprocket 562 to a sprocket 564 carried by the clevis 550 and freely rotatable relative to the sprocket 548. The chain 560 extends downwardly from the sprocket 564 to a fixed bracket 566 to which the end of the chain 560 is secured. The clevis 550 is supported by a chain 568 which extends upwardly from the clevis 550 to a sprocket 570 mounted on a fixed axle 572, and a counterweight 574 is secured to the other end of the chain 568. The counterweight 574 is heavier than the counterweight 544 so that the position of the clevis 550 and pulleys 548 and 564 carried thereby is determined by the height of the lower pleater bar 62. If the pleater bar 62 is raised relative to the pleater bar 60, the clevis 550 is moved downwardly and the counterweight 544 pulls the chain 542 to take up any slack provided by the downward movement of the clevis 552, and the chain 542 turns the drum 518 in a first direction and the scale 516 moves along the pointer 514 to indicate the distance between the pleater bars 60 and 62. When the pleater bar 62 is moved downwardly away from the pleater bar 60, the clevis 550 moves upwardly and pulls the counterweight 544 upwardly, causing the chain 542 to turn the sprocket 540 and the drum 518 in the other direction, and the scale 516 moves relative to the pointer 514 accordingly. When the pleater bar 62 is stationary and the pleater bar 60 is moved upwardly relative to the pleater bar 62, the chain 542 is pulled so that the counterweight 544 rises, and the sprocket 540 and the drum 518 are turned in the second direction to move the scale 516 correspondingly relative to the pointer 514. Conversely, when the pleater bar 60 is moved downwardly relative to the pleater bar 62, the counterweight 544 moves downwardly and the chain 542 rotates the sprocket 540 and the drum 518 in the first direction. This moves the scale 516 in accordance with the movement of the chain 542 so that the pointer will indicate the new separation of the pleater bars 60 and 62.

*Pleater bar drive unit*

Figure 8:
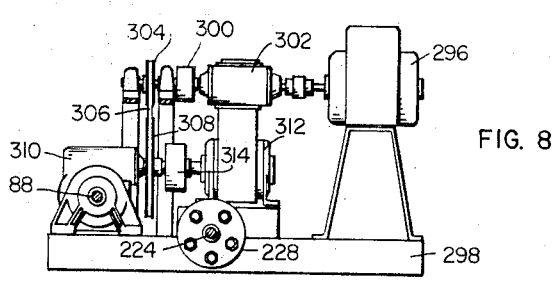
FIG. 8 is a vertical sectional view of a portion of the pleating machine of FIG. 1.
Figure 35:
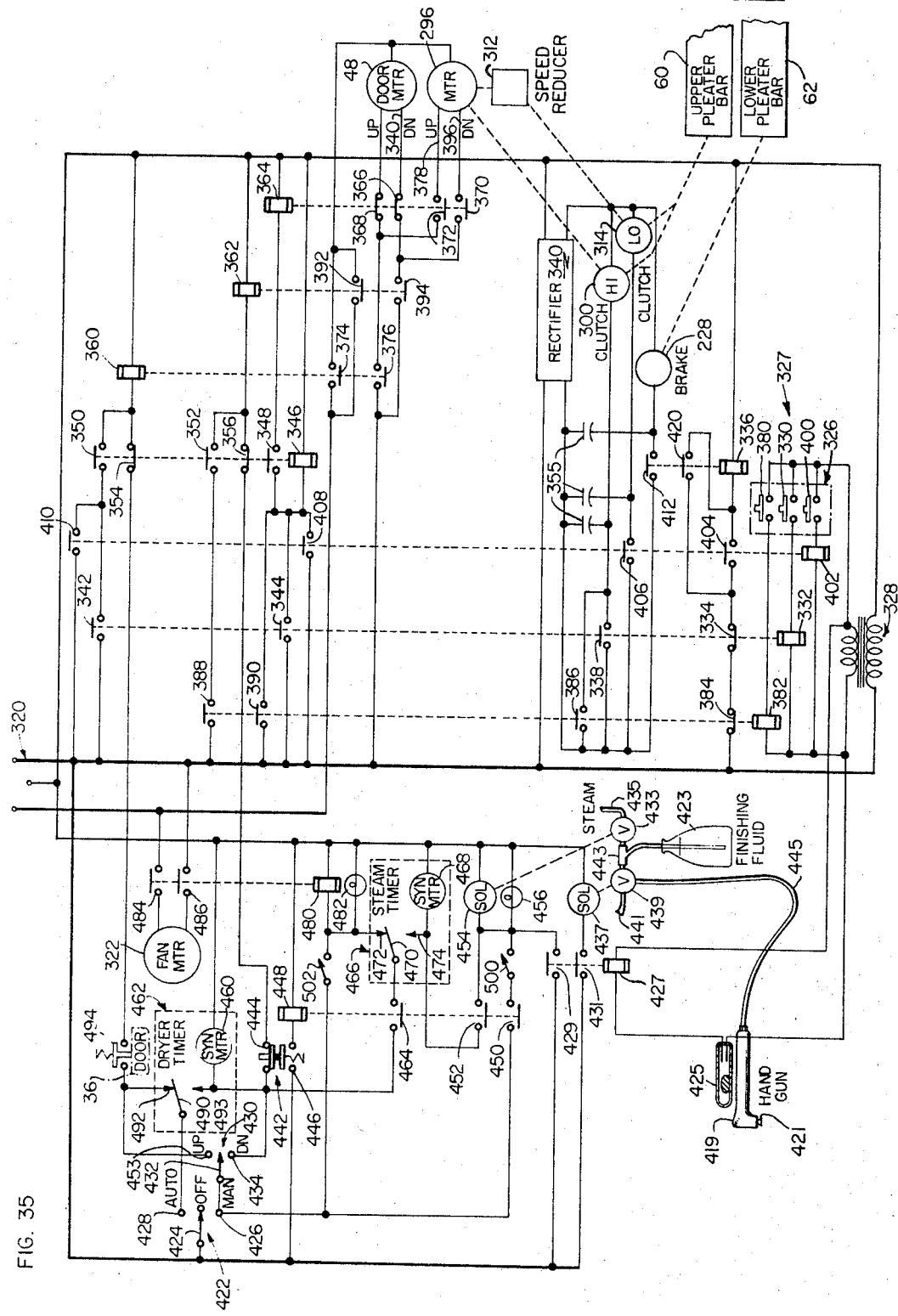
FIG. 35 is a schematic view of a wiring diagram of the pelating machine of FIG. 1.

A multi-speed drive unit is shown in FIG. 8 for driving the shaft 88 at two speeds. This drive unit includes a motor 296 which is reversible to drive the pleater bar 60 at high speed toward or away from the pleater bar 62 for unloading and threading purposes. The motor 296 is mounted on a base 298 positioned in the housing portion of the cabinet 32, and when electric clutch 300 is energized, drives the shaft 88 through a gear transmission 302, the clutch 300, a pulley 304, a belt 306, pulley 308, and a gear transmission 310, whose output is connected to the shaft 88. For driving the shaft 88 at a low speed in a direction such as to move the pleater bar 60 with high force away from the pleater bar 62 to stretch the drapery clamped between the two pleater bars, a gear reducer 312 and electric clutch 314 are provided. The gear reducer 312 is connected to the input of the gear transmission 310 when the electric clutch 314 is energized To control the operation of the clutches 300 and 314, the control circuit shown in FIG. 35 is provided. The control circuit includes a powerline 320 for supplying power to the motors 48 and 296, clutches 300 and 314 and a fan motor 322 and the brake 228. Two wires of the powerline 320 supply power to the control circuitry which includes a low voltage, manually operable control circuit 327 which is supplied with power from a transformer 328. To move the pleater bar 60 upwardly at high speed, the operator closes momentary switch 330 of a portable remote control switch 326 to energize relay winding 332. Energization of the relay winding 332 opens contacts 334 to break the circuit to relay winding 336, and closes contacts 338 to energize the clutch 300 through a rectifier 340, capacitors 355 being provided to protect the relay contacts. The relay winding 332 also closes contacts 342 and 344. Closing of contacts 344 energizes relay winding 346 which closes contacts 348, 350 and 352, and opens contacts 354 and 356. This energizes relay relay windings 360 and 364, relay winding 362 being unenergized. Energization of the winding 364 opens cotacts 366 and 368 to the door motor 48 to prevent operation thereof and closes contacts 370 and 372 to the motor 296. The energization of the winding 360 closes contacts 374 and 376 to energize the motor 296 in a direction to drive the pleater bar 60 upwardly through an up winding (not shown).

When the pleater bar 60 is moved upwardly to the desired position, the operator releases the switch 330 which opens to drop out the motor 296 and clutch 300. The operator then actuates the lower pleater bar 62 to clamp the drapery therein, and, to stretch the drapery in clamped condition, the operator closes momentary switch 400 to energize relay winding 402, and the relay winding 402 closes contacts 404, 406, 408 and 410. Closing the contacts 404 energizes the relay winding 336 which closes contacts 412 to the pleater brake 228 to hold the lower pleater bar 62 against movement. Closing the contacts 408 and 410 in relay windings 360 and 364 to energize the motor 296 to drive the upper pleater bar at very low speed and with great force upwardly through the speed reducer 296 and clutch 314 to stretch the drapery to the desired length. Contacts 338 and 386 of the relays 332 and 382 are open at this time to prevent operation of the clutch 300. When the drapery has been stretched to the desired length, the operator releases the switch 400 to stop the motor 296. The upper pleater bar is held in position against movement by the resistance of the gear reducer 310, which prevents movement of the shaft 88 by forces thereon from the pleater bar 60. Also, the relay 336 has locked itself in by closing holding contacts 420 to maintain the pleater brake 228 energized so that the drapery is held in stretched condition.

To lower the pleater bar 60 at high speed, the operator closes momentary switch 380. This causes energization of relay winding 382 to open contacts 384 to prevent energization of the relay winding 336 and close contacts 386, 388 and 390. Closing the contacts 390 energizes relay winding 346 to close contacts 348, 350 and 352 and open contacts 354 and 356 to energize down relay winding 362. The winding 362 is interlocked with the winding 360 and when one is energized the other cannot be actuated. Relay winding 362 closes contacts 392 and 394 to set up the circuit to the down winding (not shown) of the motor 312. Closing of the contacts 348 causes relay winding 364 to be energized to open contacts 366 and 368 and close contacts 370 and 372. Closing of the contacts 372 causes the down winding to be energized to move the pleater bar 60 downwardly.

Assuming the drapery 64 (FIG. 1) to be in pleated, stretched condition in the cabinet 32, the operator can, if desired, use a nozzle 421 (FIG. 35) of a hand gun 419 to spray finishing fluid from a container 423 on the drapery. When the hand gun 419 is raised from the horizontal, it causes a mercury switch 425 carried thereby to close. This energizes relay winding 427 to close contacts 429 and 431. Closing contacts 429 energizes solenoid winding 454 to open valve 433 in a steam line 435. Closing contacts 431 brings in solenoid winding 437 to move a valve 439 from a normal condition connecting the steam line 435 to a fixed nozzle 441 through an aspirator 443 to a condition connecting the steam line and aspirator to the nozzle 421 through hose 445. When the hand spraying has been finished, the operator lays the hand gun 419 down and the switch 425 opens to drop out the relay 427, which drops out the solenoids 437 and 454 to close the valve 433 and cause the valve 439 to connect the aspirator 443 to the nozzle 441 which is in a fixed position in the cabinet 32.

*Automatic operation*

To steam and dry the drapery 64, the operator then actuates switch 422 to either move contactor 424 into engagement with contact 426 for manual operation of the pleating machine, or actuates the switch 422 to move contactor 424 into engagement with contact 428 for automatic operation of the machine. Assuming the operator sets the switch 422 in condition for automatic operation of the pleating machine, the operator sets steam timer 466 to the desired period of time of steaming and then sets dryer timer 462 to a period of time equal to the steaming period plus the door closing time and the desired period of time for drying the drapery. This causes contactor 270 to move out of engagement with contact 272 and into engagement with contact 274 and contactor 490 of the dryer timer to break with contact 492 and make with contact 493. Making contact 493 starts timer motor 460 and brings in relay winding 362 to close contacts 392 and 394 to energize door motor 48 to drive in a door-closing direction through conductor 340. The doors 36 (FIG. 2) move to their closed positions at which time actuator 449 (FIG. 5) actuates limit switch 442, having previously permitted limit switch 494 to close, to open contacts 444 (FIG. 35) and close contacts 446. Opening contacts 444 drops out relay winding 362 to stop the motor 48. Closing of contacts 446 energizes relay winding 448 to close contacts 452 and 464. This starts steam timer motor 468 and causes steam and finishing fluid to be supplied to the drapery from the nozzle 441.

When steam timer 466 times out, contactor 470 moves from contact 474 to contact 472 to drop out solenoid 454, manual control switch 500 being open, to stop the steam. Closing contacts 472 brings in relay winding 360 to close contacts 484 and 486 to start exhaust fan motor 322, and warm drying air is drawn into the cabinet 32 through radiator 488 (FIG. 1) from the screen inelt 39 (FIG. 3) and the steam is pumped out of the cabinet, which continues until dryer timer 462 (FIG. 35) times out. When the timer 462 times out, the contactor 490 breaks contact with contact 493 and makes with contact 492 to energize winding 360 through limit switch 494. The relay winding 360 closes contacts 374 and 376 to the up winding (not shown) of door motor 48 to drive the doors 36 to their fully open positions, at which time the limit switch 494 is opened to stop the motor 48, limit switch 442 having been released early in the travel of the doors.

The operator then unclamps and opens the pleater bars 60 and 62 (FIG. 30) and with a wand (not shown) engages the table loader 150 (FIG. 30), unhooks the table loader from the hooks 154 and removes the table loader with the drapery from the machine. The upper pleater bar then is lowered to a position convenient for loading and the operation described above is repeated with another drapery and table loader.

*Manual operation*

The operator sets switch 422 (FIG. 35) in the manual position to connect in contactor 432 of manual switch 430, manual switch 502 and contacts 450 to manual switch 500. Then the operator can control the steaming by the switch 500 whenever the doors are closed so that limit switch 442 brings in relay winding 448. The operator also can move switch contactor 432 to contact 453 to cause actuation of the motor 48 to drive the doors 36 upwardly until limit switch 494 is opened at the fully open positions of the doors. To drive the doors downwardly, the contactor 432 is moved into engagement with contact 434 to energize relay winding 362 so long as the doors 36 are not fully closed, at which time the contacts 444 are open. Steaming is effected through the control of the manual switch 500. Thus, overriding the control of the timers 462 and 466 is effected. For automatic operation, the contactor 453 is always set in a neutral position out of contact with both contacts 430 and 453 and the switches 500 and 502 are set in open condition.

Radiator 488 (FIG. 6) supplied with steam is positioned at the lower end of the cabinet 32 directly below the pleater bars 60 and 62, and is supported by a housing 481 having an inlet 483 and a screen outlet 485 forming a part of the bottom of a loading tray 487 for supporting the drapery during threading into the pleater bars. When the doors 36 are open, a spring-pressed door 495 closes the inlet 483 to stop flow of air through the radiator.

When the doors 36 are closed, a flexible actuating arm or feeler 497 is held by a dog 499 on the adjacent door 36 in the broken line position of the feeler 497 to hold the door 495 in a fully open position so that air can flow freely through screen 49, which is aligned with the inlet 483, the housing 481, the radiator 488 and the screen outlet 485 to the drapery.

*Measuring and indicating device of FIGS. 36 to 39*

In FIGS. 36 to 39 there is shown a drapery length measuring and indicating device 600, which may be used to indicate directly the length of the drapery within hundredths of an inch by means of a register 602. The device 600 is coupled to the upper and lower pleater bars 60 and 62 by means of endless chains 604 and 606 coursing over sprockets 608, 610, 612 and 614 freely rotatably on fixed axis. The chains 604 and 606 mesh with sprockets 618 and 620 respectively, the rotative position of the sprocket 618 corresponding to the height of the pleater bar 60 and the rotative position of the sprocket 620 being determined by the height of the pleater bar 62. The sprocket 618 is keyed to a sleeve 622 freely rotatable on shift 624 and drives gears 626 and 628 to drive a shaft 30 which drives a sun gear 632. The sprocket 620 is keyed to the shaft 624 and drives a gear 634 keyed to the shaft 624. The gear 634 meshes with a gear 636 having an inner ring gear 638 which meshes with a planetary gear 640, the gear 636 being freely rotatable on a pin 642 carried by arm 644 fixed to a gear 646, which is freely rotatable on the shaft 630. The planetary gear 640 meshes with the ring gear 638 and the sun gear 632.

When the pleater bar 60 is moved upwardly relative to the pleater bar 62, the chain 604 turns the sprocket 618 in such a direction as to turn the gear 618 in a clockwise direction, as viewed in FIG. 39. This turns the gear 626 also in a clockwise direction, as viewed in FIG. 37, which turns the sun gear 632 in a counterclockwise direction, and the sun gear 632 meshing with the plurality gear 640 rotates the planetary gear 640 in a clockwise direction. This rotation of the planetary gear 640 about its mounting shaft revolves the planetary gear 640 in a counterclockwise direction. This turns the arm 644 in a counterclockwise direction and also the gear 646, and the gear 646 drives the register 602 to change the reading of the register 602 to correspond to the changed spacing between the pleater bars 60 and 62.

When the pleater bar 60 is stationary and the pleater bar 62 is moved away from the pleater bar 60, the chain 606 drives the sprocket 620 in such a direction as to rotate the gear 634 in a clockwise direction, as viewed in FIG. 37. This rotates the ring gear 638 in a counterclockwise direction, which again tends to revolve the planetary gear 640 in a counterclockwise direction around the axis of the shaft 630 to again actuate the register 602 in a direction increasing the reading thereof in accordance with the movement of the pleater bar 62 downwardly away from the pleater bar 60.

When the pleater bar 62 is moved upwardly relative to the pleater bar 60, the ring gear 638 is driven in the opposite direction and tends to revolve the planetary gear 640 in the opposite direction to operate the register 602 in the opposite direction. When the pleater bars 60 and 62 are moved together as a unit, the gears 632 and 638 rotate in opposite directions at the same peripheral teeth speed, and the gear 640 merely rotates without turning the arm 644 and the gear 646 so that the register 602 is not changed. Grooved keeper rollers 652 and 654 maintain the chains 606 and 604 in meshing engagement with the sprockets 620 and 618, respectively.

Figure 40:
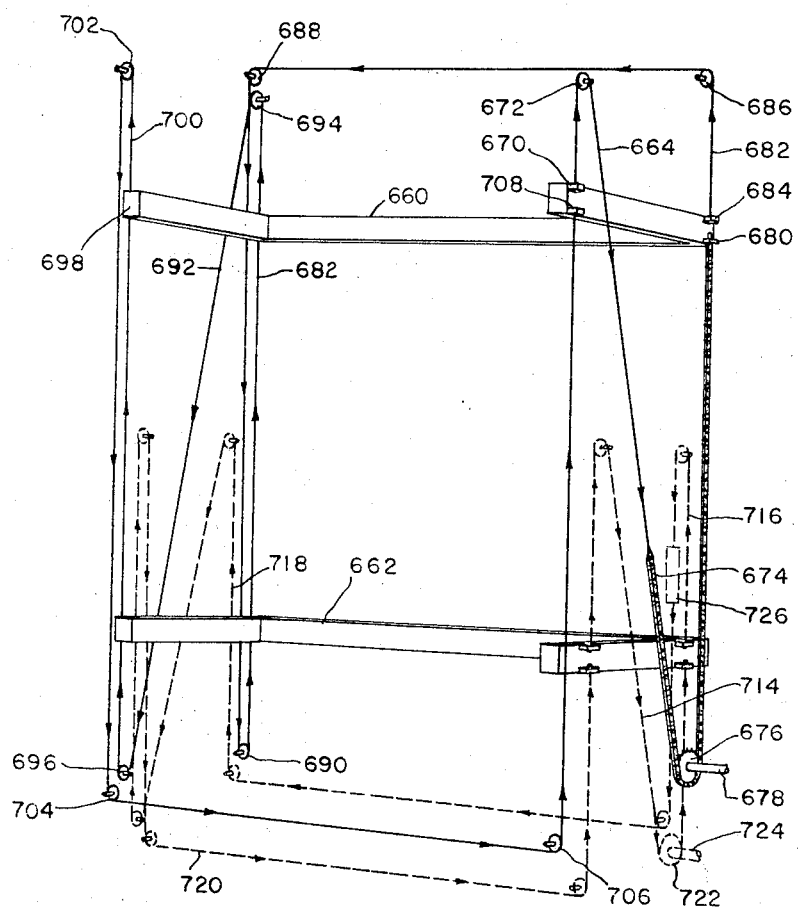
FIG. 40 is a schematic view of a draper pleating machine forming an alternate embodiment of the invention.
Figure 41:
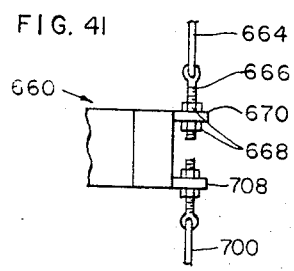
FIG. 41 is an enlarged, fragmentary elevation view of a portion of the pleating machine of FIG. 40.

*Pleating machine of FIGS. 40 and 41*

In FIGS. 40 and 41 there is shown a pleating machine forming an alternate embodiment of the invention, and including upper pleater bar 660 substantially identical with the pleater bar 60, and a lower pleater bar 662 substantially identical with the pleater bar 62. Instead of the chains 70 for driving the pleater bar 660 there is provided a cable or strand 664 attached by an adjustable eye bolt 666 and nuts 668 to a bracket 670 fixed to the pleater bar 660 at one end of the cable 664. The cable 664 travels up over a freely rotatable pulley 672 thence downwardly to one end of a chain 674 to which the cable 664 is secured. The chain 674 travels downwardly under and in meshing engagement with a sprocket 676 keyed to a drive shaft 678 and the other end of the chain 674 is attached to a bracket 680 secured to the pleater bar 660. A cable or strand 682 is attached to a bracket 684 directly above the bracket 680, and travels directly upwardly to and over a freely rotatable sprocket 686 rotatable on a fixed axis, over a sprocket 688, directly downwardly to and under a pulley 690 and thence upwardly to the bottom of the third corner of the frame of the pleater bar 660 to which the cable 682 is fastened. A cable 692 is fixed at one end thereof to the frame of the pleater bar 660 directly above the attachment of the cable 682 thereto and travels directly upwardly from that corner to and over a freely rotatable pulley 694, thence generally downwardly to a freely rotatable pulley 696, the pulleys 694 and 696 being rotatable on fixed axes, and upwardly to a corner 698 of the pleater bar 660 to which the end of the cable 692 is fastened.

A cable 700 is attached to the corner 698 of the frame of the pleater bar 660, extends directly upwardly therefrom, travels over a freely rotatable pulley 702 rotatable on a fixed axis, downwardly and partially around a pulley 704 rotatable on a fixed axis, over to and under a pulley 706 rotatable on a fixed axis, and directly upwardly to a bracket 708 positioned directly below the bracket 670, and is fixed thereto adjustably.

When the shaft 678 is driven, it drives the pleater bar 660 upwardly or downwardly depending upon the direction of rotation thereof, and the interlinking cables connecting the several corners of the frame of the pleater bar 660 maintain the frame of the pleater bar 660 in a horizontal position and raise and lower the pleater bar 660. Each of the cables is connected to the top of one corner and the bottom of another corner so that, as the portion connected to the top of one corner shortens, the portion connected to the bottom of the other corner lengthens by the same amount.

The pleater bar 662 is similarly mounted for movement of cables 714, 716, 718 and 720, with the cable 714 traveling around a capstan 722 fixed to a shaft 724 connected to a braking mechanism (not shown). A counterweight 726 fixed to the cable 716 counterbalances the weight of the pleater bar 662.

Figure 42:
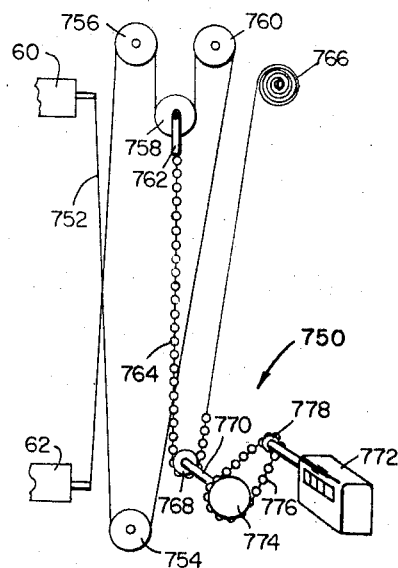
FIG. 42 is a schematic view of a drapery length measuring device forming an alternate embodiment of the invention.
Figure 34:
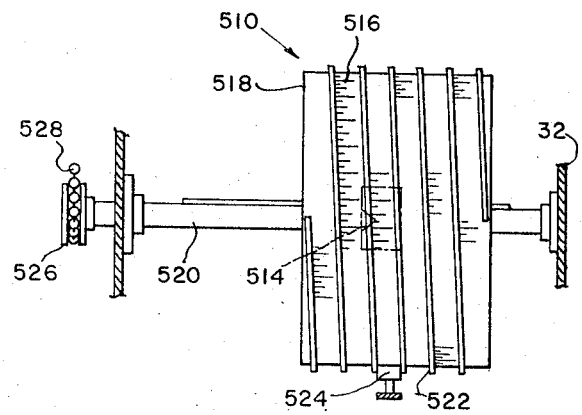
FIG. 34 is an enlarged, vertical sectional view showing a portion of the device of FIG. 33.

*Measuring and indicating device of FIG. 42*

In FIG. 42 there is shown a drapery length measuring and indicating device 750 forming an alternate embodiment of the invention. The device includes a chain 752 connected at its ends to pleater bars 60 and 62, respectively. The chain extends from the bar 60 under idler sprocket 754, over idler sprocket 756, under sprocket 758 and over sprocket 760. The sprockets 754, 756 and 760 are rotatable on fixed axes, and the sprocket 758 is supported by the bight of the chain between the sprockets 756 and 760 and supports clevis 762. The sprocket 758 moves half of the distance of any relative movement between the pleater bars 60 and 62 and moves a cable 764 secured to the clevis 762 and to a known spring takeup device 766 keeping the cable 764 under tension. The cable 764 travels under sprocket 768 keyed to shaft 770 driving counter 772 through sprocket 774, chain 776 and sprocket 778 of the counter 772. By means of the above cable system, a two-to-one reduction is effected between relative movement of the bars 60 and 62 and movement of the cable 764.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a pleating machine, a frame,
   upper clamping means on the frame and having opposed comb-like members movable between open threading positions and closed clamping positions for clamping the upper end portion of a drapery in pleated form,
   lower clamping means on the frame and having opposed comb-like members movable between open threading positions and closed clamping positions for clamping the lower end of a drapery in pleated form,
   a table loader for suspending a drapery in pleated form through the upper and lower clamping means when the comb-like members of the upper and lower clamping means are in open positions,
   and quick detachable means for mounting the table loader on the frame.

2. In the pleating machine of claim 1,
   means for moving the upper clamping means to a loading position close to the lower clamping means and for moving the upper clamping means away from the lower clamping means after a drapery has been threaded therebetween,
   means for initially moving the comb-like members of the lower clamping means together to hold the drapery in pleated condition and permit the drapery to slide therethrough,
   and means for actuating the lower clamping means to clamp the drapery in pleated condition after the upper clamping means has been moved away from the lower clamping means.

3. In a pleating machine,
   upper clamping means having opposed comb-like members movable between open threading positions and closed clamping positions for clamping the upper end portion of a drapery in pleated form,
   lower clamping means having opposed comb-like members movable between open threading positions and closed clamping positions for clamping the lower end of a drapery in pleated form,
   a table loader adapted to suspend a drapery in pleated form through the upper and lower clamping means when the comb-like members of the upper and lower clamping means are in open positions,
   and means for moving the upper clamping means between a lower loading position and an upper stretching position.

4. In a pleating machine,
   lower pleater bar means movable from an open threading condition to a closed pleating condition and from the pleating condition to a clamping condition clamping the lower end of a drapery in pleated condition,
   upper pleater bar means positioned above the lower pleater bar means,
   loader bar means supported by the upper pleater bar means for clamping the upper end of a drapery and holding the upper end of the drapery pleated and suspending the drapery into the lower pleater bar means,
   and means detachably mounting the loader bar means on the upper pleater bar means to permit the loader bar means to be removed from the support means for mounting a drapery into the loader bar means in pleated condition while the loader bar means is removed from the upper pleater bar means.

5. In a pleating machine,
   a lower clamping frame,
   an upper clamping frame,
   flexible strand means supporting the upper clamping frame in a horizontal position for moving the upper clamping frame toward and away from the lower clamping frame,
   reversible high speed drive means for driving the flexible strand means to move the upper frame toward and away from the lower frame,
   low speed drive means in parallel with the high speed drive means for driving the flexible strand means away from the lower frame,
   and means for selectively connecting the high speed drive means and the low speed drive means to the flexible strand means.

6. In a pleating machine,
   a vertical guideway,
   a clamping frame having four corner portions and mounted in the guideway in a horizontal position and movable up and down the guideway,
   a plurality of strand means connected to the four corner portions and to the guideway,
   means for guiding and supporting the strand means in positions extending parallel to the guideway,
   and means for moving the plurality of strand means together to raise and lower the clamping frame and maintain the clamping frame in a horizontal plane as the clamping frame is raised and lowered.

7. In a pleating machine,
   a vertical guideway,
   a clamping frame having four corner portions and mounted in the guideway in a horizontal position and movable up and down the guideway,
   four endless chains connected to the corner portions of the frame and to the guideway,
   sprocket means on fixed axes mounting the chains in vertical planes,
   four T-shaped members guiding the chains,
   and a plurality of bevelled rollers carried by the clamping frame at corners thereof and extending into the corners of the T-shaped members.

8. In a pleating machine,
   a vertical guideway,
   a clamping frame having four corner portions and mounted in the guideway in a horizontal position and movable up and down the guideway,
   a plurality of strand means connected to the four corner portions and to the guideway,
   means for supporting and guiding the strand means in positions extending parallel to the guideway,
   means for moving the plurality of strand means together to raise and lower the clamping frame and maintain the clamping frame in a horizontal plane as the clamping frame is raised and lowered,
   and a plurality of bevelled rollers carried by the clamping frame at corners thereof and extending into the corners of the T-shaped members.

9. In a pleating machine,
   a vertical guideway,
   a clamping frame having four corner portions and mounted in the guideway in a horizontal position and movable up and down the guideway,
   four endless chains connected to the corner portions and to the guideway,
   sprocket means supporting the chains and mounting the chains in vertical planes,
   two pairs of first sprockets mounting the chains,
   a first shaft connecting sprorkets of two of the chains together,
   a second shaft connecting the sprockets of the other two chains together,
   a third shaft connecting the first and second shafts,
   and means for driving one of the shafts.

10. In a pleating machine,
    a vertical guideway,
    a first clamping frame in the guideway in a horizontal position and movable up and down the guideway,
    strand means connected to the guideway and connected to and supporting the first clamping frame, pulley means on the guideway supporting the strand means,
means for moving the strand means to raise and lower the first clamping frame,
a second clamping frame movable along the guideway below the first clamping frame,
second strand means connected to the guideway and the second clamping frame for supporting the second clamping frame,
pulley means on the frame supporting the second strand means,
means tending to balance the weight of the second clamping frame,
and brake means for locking the second clamping frame against movement along the guideway.

11. In a pleating machine,
a vertical cabinet having a front opening and a rear opening,
drapery stretching means in the cabinet and accessible through the openings,
a flexible front door,
front takeup means for suspending the front door in a position covering the front opening and adapted to roll up the door to expose the front opening,
a flexible rear door,
rear takeup means for suspending the rear door in a position covering the rear opening and adapted to roll up the rear door to expose the rear opening,
fluid supply means for introducing fluid into the cabinet after the doors are closed,
and means for preventing operation of the fluid supply means when the doors are open.

12. In a pleating machine,
a vertical cabinet having a front opening and a rear opening,
a flexible front door,
front takeup means for suspending the front door in a position covering the front opening and adapted to roll up the door to expose the front opening,
a flexible rear door,
rear takeup means for suspending the rear door in a position covering the rear opening and adapted to roll up the rear door to expose the rear opening,
common drive means for driving the front and rear takeup means,
stretching means in the cabinet for stretching a drapery,
second drive means for driving the stretching means,
means for supplying fluid to the interior of the drapery after the doors are closed,
first power means for actuating the common drive means,
second power means for actuating the second drive means,
and a remote control switch device for actuating the first and second power means individually.

13. In a table loader of a pleating machine,
a bar,
a plurality of pairs of clamps spaced from one another and mounted on and extending in parallel planes from one side of the bar,
means urging the clamps of each pair individually together,
each pair of the clamps being provided with manually engageable portions for manual opening of the clamps to permit an end portion of a drapery to be positioned between the clamps,
and means for mounting the bar for quick detachment from a pleating machine.

14. In a table loader of a pleating machine,
a bar having a plurality of parallel abutments spaced from one another,
a plurality of clamping members,
means urging the clamping members toward the abutments,
the clamping members each extending from said one side beyond the abutments to provide manually engageable portions for manual movement of the clamping members away from the abutments to permit an end portion of a drapery to be positioned between the clamping finger and abutment associated therewith,
and means for mounting the bar for quick detachment from the pleating machine.

15. In a table loader for a pleating machine,
a plate having a plurality of slots therein,
a plurality of abutment fingers mounted on the plate in positions extending from one side of the plate,
a plurality of clamping fingers mounted pivotally in the slots, and having portions pivotal toward and away from the abutment fingers,
spring means urging the clamping fingers toward clamping positions relative to the abutment fingers,
and means for mounting the plate for detachment from the pleating machine.

16. In a table loader for a pleating machine,
a plate having a plurality of transverse slots spaced therealong,
each slot having a central entrance portion of a predetermined length and opposed side notch portions of a lesser length,
a plurality of first clamping fingers having notched portions extending through the slots and fitting in the notch portions,
a plurality of second clamping fingers having notched portions fitting pivotally in the notch portions,
and a plurality of compression springs seated between portions of the first and second clamping fingers on one side of the plate and urging the second clamping fingers toward clamping positions relative to the first clamping fingers.

17. In a table loader for a pleating machine,
a plate having a plurality of slots spaced therealong,
a plurality of fixed clamping fingers extending through the slots and having first portions outside the channel and L-shaped portions positioned in the channel,
the plate having hook members in the channel engaging the bases of the L-shaped portions and holding the fixed clamping fingers rigidly on the plate,
a plurality of substantially straight pivotal clamping fingers pivotally mounted in the slots and having inner portions positioned in the channel and also having outer portions outside the channel opposed to the first portions of the fixed clamping fingers,
and a plurality of compression springs seated between the inner portions of the pivotal clamping fingers and the L-shaped portions of the fixed clamping fingers and urging the outer portions of the pivotal clamping fingers toward clamping positions relative to the first portions of the fixed clamping fingers.

18. In a table loader for a pleating machine,
a channel having flanges provided with retaining grooves,
a plate having fixed abutment fingers extending from one side thereof and also having slots adjacent the abutment fingers,
a plurality of pivotal clamping fingers extending through the slots,
the pivotal clamping fingers being pivotal toward and away from the abutments,
and a plurality of springs engaging the pivotal clamping fingers and urging the pivotal clamping fingers toward clamping positions relative to the fixed abutment fingers.

19. In a pleating machine,
a plurality of vertical guides,
a generally rectangular carriage having four corners and extending horizontally between the guides,
drapery-holding means on the carriage,
a plurality of first pulleys positioned directly above the corners of the carriage, a plurality of second pulleys positioned directly below
the corners of the carriage,
and a plurality of flexible strands connected to the corners of the carriage and trained on the pulleys,
each strand being secured to two corners and extending upwardly from one of the corners over one of the first pulleys, downwardly to and under one of the second pulleys and upwardly to one of the other corners and being connected to said one of the other corners.

20. In a pleating machine,
a pair of vertical guides,
a generally rectangular carriage having first and second corners at one end thereof and third and fourth corners at a second end thereof,
the carriage extending horizontally between the guides,
drapery holding means on the carriage,
a first pulley positioned directly above the first corner,
a second pulley positioned directly below the second corner,
a first strand fixed to the first corner and extending under tension from the first corner over the first pulley and under the second pulley to the second corner and fixed to the second corner,
a third pulley positioned directly below the first pulley,
a fourth pulley positioned directly above the third corner,
a second strand fixed to the first and second corners and extending under tension under the third pulley and over the fourth pulley,
a fifth pulley directly below the third corner,
a sixth pulley directly over the fourth corner,
a third strand fixed to the third and fourth corners and extending from the third corner under the fifth pulley and over the sixth pulley to the fourth corner,
a seventh pulley directly below the fourth corner,
an eighth pulley directly above the second corner,
and a fourth strand fixed to the second and fourth corners and extending from the fourth corner under the seventh pulley and over the eighth pulley to the second corner.

21. In a pleatng machine,
an elongated pleating frame having first and second ends,
a vertical guideway for guiding the pleating frame,
a first pulley directly over the first end of the pleating frame,
a second pulley directly under the second end of the pleatnig frame,
a first strand fixed to the first and second ends of the pleating frame and extending from the first end of the pleatnig frame over the first pulley and under the second pulley to the second end of the pleating frame,
a third pulley directly under the first end of the pleating frame,
a fourth pulley directly over the second end of the pleating frame,
and a second strand fixed to the first and second ends of the pleating frame and extending from the first end of the pleating frame under the third pulley and over the fourth pulley to the second end of the pleating frame.

22. In a pleating machine,
a cabinet having a doorway,
a door movable relative to the doorway between an open position and a closed position,
power means for driving the door,
drapery-stretching means in the cabinet,
steam means for steaming a drapery in the cabinet,
drying means for supplying a drying field to the drapery,
timing means for sequentially actuating the steam means, the drying means and the power means to drive the door from its closed position to its open position,
and limit means for stopping the power means when the door reaches its open position.

23. In a pleating machine,
upper drapery-clamping means,
lower drapery-clamping means below the upper drapery-clamping means,
guide means mounting the upper and lower drapery-clamping means for individual movement toward and away from each other,
reversible high speed means for moving the upper drapery-clamping means toward and away from each other,
low speed means in parallel with the high speed means for moving the upper drapery-clamping means away from the lower drapery-clamping means to stretch a drapery clamped thereby,
brake means for holding the lower drapery-clamping means against movement along the guide means,
and means for simultaneously actuating the low speed means and the brake means.

24. In a pleating machine,
first drapery-clamping means,
second drapery-clamping means movable toward and away from the first drapery-clamping means,
means for holding the first drapery-clamping means in a fixed position,
high speed power means for moving the second drapery-clamping means toward and away from the first drapery-clamping means,
and low speed power means in parallel with the high speed power means for moving the second drapery-clamping means away from the first drapery-clamping means to stretch a drapery clamped by the drapery-clamping means.

25. In a pleating machine,
a first comb-like member having a plurality of first teeth of a predetermined length,
and a second comb-like member having a plurality of second teeth adapted to enter between the first teeth to a predetermined extent and also having a pair of teeth bracketing the second teeth and projecting farther than the first teeth to lay alongside of end pleats of the drapery and hold the end pleats with the first teeth.

26. In a pleating machine,
a vertical cabinet having an opening therein,
lower pleating bar means,
means mounting the lower pleating bar means in the cabinet,
upper pleating bar means,
means mounting the upper pleating bar means in the cabinet for movement toward and away from the lower pleating bar means,
means for moving the upper pleating bar means toward and away from the lower pleating bar means,
closure means for opening and closing the opening movable between an open position and a closed position,
radiator means in the cabinet having an air passage therethrough,
means normally blowing air through the air passage into the cabinet,
flow control means operable when actuated to close the air passage,
and means responsive to the position of the door for actuating the flow control means to close the air passage when the closure means is open.

27. In a table loader for a pleating machine,
a plate having transverse slots spaced therealong,
a plurality of fixed clamping fingers secured to the plate,
a plurality of movable clamping fingers extending through the slots and pivotal therein,
a plurality of springs urging the movable clamping fingers toward the fixed clamping fingers,
the pairs of the fixed and movable clamping fingers defining tapered entrance portions to facilitate insertion therebetween of portions of a drapery at the end of the drapery, and lateral guiding means holding the movable clamping fingers in lateral alignment with the fixed clamping fingers during movement of the movable clamping fingers.

References Cited

UNITED STATES PATENTS

| | | | |
|---|---|---|---|
| 1,251,516 | 1/1918 | Hardesty | 223—28 X |
| 2,451,978 | 10/1948 | Richter | 223—76 |
| 3,315,852 | 4/1967 | Getchell et al. | 223—76 |
| 2,689,071 | 9/1954 | Richter | 223—76 |
| 2,699,010 | 1/1955 | Reed | 223—33 X |
| 2,759,273 | 8/1956 | Boyes | 223—51 X |
| 2,837,257 | 6/1958 | Gibson et al. | 223—30 |
| 2,856,108 | 10/1958 | Richter | 223—76 |
| 2,954,907 | 10/1960 | Bird | 223—30 |
| 3,147,895 | 9/1964 | Boyes | 223—51 |
| 3,154,228 | 10/1964 | Klint | 223—32 |

JORDAN FRANKLIN, *Primary Examiner.*

GEORGE V. LARKIN, *Assistant Examiner.*

U.S. Cl. X.R.

34—45; 156—585; 269—154